United States Patent
Sasaki

(10) Patent No.: US 10,224,549 B2
(45) Date of Patent: Mar. 5, 2019

(54) BINDER COMPOSITION FOR SECONDARY BATTERY NEGATIVE ELECTRODE, NEGATIVE ELECTRODE FOR SECONDARY BATTERY, NEGATIVE ELECTRODE SLURRY COMPOSITION, MANUFACTURING METHOD, AND SECONDARY BATTERY

(75) Inventor: Tomokazu Sasaki, Tokyo (JP)

(73) Assignee: ZEON CORPORATION, Tokyo (JP)

(*) Notice: Subject to any disclaimer, the term of this patent is extended or adjusted under 35 U.S.C. 154(b) by 40 days.

(21) Appl. No.: 14/241,722

(22) PCT Filed: Aug. 24, 2012

(86) PCT No.: PCT/JP2012/071463
§ 371 (c)(1),
(2), (4) Date: Feb. 27, 2014

(87) PCT Pub. No.: WO2013/031690
PCT Pub. Date: Mar. 7, 2013

(65) Prior Publication Data
US 2014/0205904 A1    Jul. 24, 2014

(30) Foreign Application Priority Data
Aug. 30, 2011 (JP) .................................. 2011-187087

(51) Int. Cl.
| | | |
|---|---|---|
| C08F 220/06 | (2006.01) |
| H01M 4/62 | (2006.01) |
| C08F 220/18 | (2006.01) |
| C08L 25/10 | (2006.01) |
| H01M 4/134 | (2010.01) |
| H01M 4/1395 | (2010.01) |
| H01M 4/136 | (2010.01) |
| H01M 4/1397 | (2010.01) |

(52) U.S. Cl.
CPC .......... H01M 4/623 (2013.01); C08F 220/18 (2013.01); C08L 25/10 (2013.01); H01M 4/622 (2013.01); H01M 4/134 (2013.01); H01M 4/136 (2013.01); H01M 4/1395 (2013.01); H01M 4/1397 (2013.01)

(58) Field of Classification Search
CPC ...... H01M 4/622; H01M 4/623; H01M 4/134; H01M 4/1397; H01M 4/1395; H01M 4/136; C08L 25/10; C08L 33/02; C08L 33/16; C08F 220/18; C08F 220/06; C08F 212/08; C08F 236/10; C08F 2220/1825; C08F 2220/585; C08F 220/24
See application file for complete search history.

(56) References Cited

U.S. PATENT DOCUMENTS

| | | | |
|---|---|---|---|
| 2010/0112441 A1 | 5/2010 | Fukumine et al. | |
| 2011/0159362 A1* | 6/2011 | Wakizaki | H01G 9/02 429/209 |
| 2012/0021298 A1* | 1/2012 | Maeda | H01M 4/131 429/304 |
| 2012/0189913 A1* | 7/2012 | Wakizaka | H01M 4/133 429/211 |
| 2013/0330622 A1 | 12/2013 | Sasaki | |

FOREIGN PATENT DOCUMENTS

| | | | |
|---|---|---|---|
| JP | 11-167921 A | | 6/1999 |
| JP | 2002-42819 A | | 2/2002 |
| JP | 2003-217573 A | | 7/2003 |
| JP | 2003-308841 A | | 10/2003 |
| JP | 2010-146870 A | | 7/2010 |
| KR | 10-2009-0125782 A | | 12/2009 |
| WO | WO2007-125924 | * | 4/2007 |
| WO | WO 2011/001848 A1 | | 1/2011 |
| WO | WO2011/037142 | * | 3/2011 |
| WO | WO 2012/115096 A1 | | 8/2012 |

OTHER PUBLICATIONS

Machine Translation: JP 2010-146870.*
Machine Translation: WO 2007-125924.*
Chinese Office Action and Search Report, dated Jul. 3, 2015, for corresponding Chinese Application No. 201280041588.4.
Extended European Search Report dated Aug. 5, 2015, issued in corresponding European Patent Application No. 12827649.0.
International Search Report, dated Nov. 6, 2012, issued in PCT/JP2012/071463.
Written Opinion of the International Searching Authority, dated Nov. 6, 2012, issued in PCT/JP2012/071463.

* cited by examiner

Primary Examiner — Stephen J Yanchuk
(74) Attorney, Agent, or Firm — Birch, Stewart, Kolasch & Birch, LLP

(57) ABSTRACT

A binder composition for a negative electrode of a secondary battery, including a particulate binder, and a water-soluble polymer containing an acidic functional group, wherein the water-soluble polymer has an ion conductivity of $1 \times 10^{-5}$ to $1 \times 10^{-3}$ S/cm; and a swelling degree of the water-soluble polymer to a liquid with a solubility parameter of 8 to 13 $(cal/cm^3)^{1/2}$ is 1.0 to 2.0 times a swelling degree of the particulate binder measured under the same conditions; and use thereof.

10 Claims, No Drawings

BINDER COMPOSITION FOR SECONDARY BATTERY NEGATIVE ELECTRODE, NEGATIVE ELECTRODE FOR SECONDARY BATTERY, NEGATIVE ELECTRODE SLURRY COMPOSITION, MANUFACTURING METHOD, AND SECONDARY BATTERY

FIELD

The present invention relates to a binder composition for a negative electrode of a secondary battery, a negative electrode for a secondary battery, a slurry composition for a negative electrode for producing the negative electrode, a method for producing the negative electrode, and a secondary battery provided with the negative electrode.

BACKGROUND

In recent years, handheld terminal devices such as laptop personal computers, cellular phones, and PDAs (Personal Digital Assistants) are being remarkably widespread. As the secondary batteries as the power source in these handheld terminal devices, e.g., nickel-hydrogen secondary batteries and lithium ion secondary batteries are often used. The handheld terminal devices are required to have a comfortable portability, and such devices are rapidly becoming more compact, thin and lightweight with better performance. As a result, the handheld terminal devices are now being used in a wide variety of situations. Like the handheld terminal devices, the secondary battery is also required to be more compact, thin and lightweight with better performance.

For improving the performance of the secondary battery, there have been studied modification of the electrode, the electrolyte liquid, and other members of the battery. Among them, the electrode is usually produced by: mixing an electrode active material and, if necessary, a electroconducting agent such as electroconductive carbon, with a liquid composition in which a polymer serving as a binder (binding agent) is dispersed or dissolved in a solvent such as water or an organic liquid to prepare a slurry composition; then applying the slurry composition onto a current collector; and drying the slurry composition. As to electrodes, in addition to the studies on the electrode active material and current collectors themselves, there have also been made studies on binders for binding electrode active materials, etc. to a current collector, as well as a variety of types of additives (see, e.g., Patent Literatures 1 to 4).

For example, Patent Literature 1 discloses use of a binder containing crosslinkable polymer particles. Patent Literatures 2 and 3 disclose a slurry for a negative electrode of a non-aqueous secondary battery, the slurry containing a binder composed of a carbonaceous active material, a water-dispersed emulsion resin, and a water-soluble polymer. As the water-soluble polymers, those such as polyvinyl alcohol, carboxymethyl cellulose, and sodium polyacrylate are described. According to the description of the literatures, the coating strength and coating density in the batteries can thereby be made favorable.

Patent Literature 4 discloses a binder for an electrode of a secondary battery. The binder in this Literature consists of a copolymer latex obtained by emulsion polymerization of monomers composed of 0.02 to 13% by weight of a fluorine-containing unsaturated monomer, 10 to 38% by weight of an aliphatic conjugated diene monomer, 0.1 to 10% by weight of an ethylenically unsaturated carboxylic acid monomer, and 49 to 88.88% by weight of a monomer copolymerizable with the aforementioned monomers. According to the description of the literature, this results in good properties regarding mixing stability, blocking resistance, anti powder-falling property and binding strength.

Further, Patent Literature 5 discloses a binder for a secondary battery electrode. The binder in this literature is composed of a polymer with a monomer unit derived from a fluorine-atom containing monomer such as a fluorinated alkyl (meth)acrylate. The literature also discloses that a cellulose-based polymer, a polyacrylate, and the like may be added in order to improve the application capability and the charging-discharging property. According to the descriptio of the literature, an electrode which can persistently exert high bonding property with an active material can thereby be obtained.

CITATION LIST

Patent Literature

Patent Literature 1: Japanese Patent Application Laid-Open No. Hei. 11-167921 A
Patent Literature 2: Japanese Patent Application Laid-Open No. 2003-308841 A
Patent Literature 3: Japanese Patent Application Laid-Open No. 2003-217573 A
Patent Literature 4: Japanese Patent Application Laid-Open No. 2010-146870 A
Patent Literature 5: Japanese Patent Application Laid-Open No. 2002-42819 A

SUMMARY

Technical Problem

In a secondary battery, particles of an electrode active material contained in a negative electrode may expand and shrink during charging and discharging. When such expansion and shrinkage are repeated, the negative electrode may gradually swell, and this may cause deformation of the secondary battery. Accordingly, there is a demand for development of a technique for suppressing such swelling of the negative electrode.

Further some prior-art secondary batteries cause capacity decrease after strage in a high-temperature environment such as 60° C., and in a low-temperature environment such as −25° C. Accordingly, there is also a demand for development of a technique for suppressing the decrease in the capacity of a secondary battery when it is stored in such environments.

Further, as to the prior-art secondary batteries, there is also a demand for development of a technique for suppressing a decrease in the capacity due to repeated charging and discharging in a high-temperature environment. Further, to enhance the aforementioned performance, there is also a demand for increasing the adhesion between a current collector and an electrode active material layer formed thereon in the production of an electrode for a secondary battery. In addition, there is also a demand for efficiently producing products with uniform quality.

Thus an object of the present invention is to provide a binder composition for a negative electrode of a secondary battery and a negative electrode for a secondary battery which realize a secondary battery in which: swelling of the negative electrode due to charging and discharging is suppressed; decrease in capacity is suppressed even after storage in a high-temperature or low-temperature environment;

and decrease in capacity due to repeated charging and discharging in a high-temperature environment is also suppressed. Another object of the present invention is to provide a slurry composition for a negative electrode, and a method for producing a negative electrode for a secondary battery that realize efficient production of such a negative electrode for a secondary battery, as well as to provide a secondary battery having such a negative electrode for a secondary battery.

Solution to Problem

In order to solve the foregoing problems, the present inventor has conducted extensive studies. The present inventor focused on the relationship between the physical properties of a water-soluble polymer, which is contained in a binder composition for a negative electrode for a secondary battery whose medium is water, and the performances of the secondary battery. As a result, the present inventor has found out that the aforementioned problems can be solved by employing a water-soluble polymer that has a specific ion conductivity and also has a swelling degree that is in a specific ratio relative to the swelling degree of a binder particle.

Specifically, according to the present invention, following [1] to [11] are provided:

(1) A binder composition for a negative electrode of a secondary battery, comprising a particulate binder, and a water-soluble polymer containing an acidic functional group, wherein:

the water-soluble polymer has an ion conductivity of $1\times10^{-5}$ to $1\times10^{-3}$ S/cm; and a swelling degree of the water-soluble polymer to a liquid with a solubility parameter of 8 to 13 $(cal/cm^3)^{1/2}$ is 1.0 to 2.0 times a swelling degree of the particulate binder measured under the same conditions.

(2) The binder composition for a negative electrode of a secondary battery according to (1), wherein the water-soluble polymer contains a crosslinkable monomer unit, and a containing ratio of the crosslinkable monomer unit in the water-soluble polymer is 0.1 to 2% by weight.

(3) The binder composition for a negative electrode of a secondary battery according to (1) or (2), wherein the water-soluble polymer contains a fluorine-containing (meth) acrylic acid ester monomer unit, and a containing ratio of the fluorine-containing (meth)acrylic acid ester monomer unit in the water-soluble polymer is 1 to 20% by weight.

(4) The binder composition for a negative electrode of a secondary battery according to any one of (1) to (3), wherein the water-soluble polymer contains a reactive surfactant unit, and a containing ratio of the reactive surfactant unit in the water-soluble polymer is 0.1 to 15% by weight.

(5) The binder composition for a negative electrode of a secondary battery according to any one of (1) to (4), wherein a containing ratio of the particulate binder relative to the water-soluble polymer is such that (the particulate binder)/ (the water-soluble polymer)=99.5/0.5 to 99/5 (weight ratio).

(6) A negative electrode for a secondary battery, comprising the binder composition for a negative electrode of a secondary battery according to any one of (1) to (5), and a negative electrode active material.

(7) The negative electrode for a secondary battery according to (6), wherein the negative electrode active material contains a metal that stores and releases lithium.

(8) The negative electrode for a secondary battery according to (6) or (7), wherein the negative electrode active material contains a Si-containing compound.

(9) A slurry composition for a negative electrode of a secondary battery, comprising a negative electrode active material, the binder composition for a negative electrode of a secondary battery according to any one of (1) to (5), and water.

(10) A method for producing a negative electrode for a secondary battery, comprising: applying the slurry composition for a negative electrode of a secondary battery according to (9) onto a current collector; and drying the slurry composition.

(11) A lithium ion secondary battery, comprising: a positive electrode; a negative electrode; an electrolyte liquid; and a separator, wherein the negative electrode is the negative electrode for a secondary battery according to any one of (6) to (8).

Advantageous Effects of Invention

With the binder composition for a negative electrode of a secondary battery and the negative electrode for a secondary battery according to the present invention containing the same, it is possible to realize a secondary battery in which: swelling of the negative electrode due to charging and discharging is suppressed; decrease in capacity is suppressed even after storage in a high-temperature or low-temperature environment; and decrease in capacity due to repeated charging and discharging in a high-temperature environment is also suppressed. The negative electrode for a secondary battery according to the present invention can be readily produced as an electrode that has small numbers of pinholes, has high adhesion between a current collector and a negative electrode active material layer, and causes little degree of adhesion decrease during its use. Therefore, the negative electrode according to the present invention can be readily produced while satisfying the aforementioned performance requirements.

The secondary battery according to the present invention is a battery in which: swelling of the negative electrode due to charging and discharging can be suppressed; decrease in capacity is suppressed even after storage in a high-temperature or low-temperature environment; and decrease in capacity due to repeated charging and discharging in a high-temperature environment is also suppressed.

With the slurry composition for a negative electrode according to the present invention, the negative electrode for a secondary battery according to the present invention can be produced. In particular, as the slurry is highly stable, the slurry has low tendency to cause non-uniform distribution of particles dispersed therein. As a result, the slurry enables easy production of a high-performance battery.

With the method for producing a negative electrode for a secondary battery according to the present invention, the negative electrode for a secondary battery according to the present invention can be produced.

DESCRIPTION OF EMBODIMENTS

The present invention will be described hereinbelow in detail by way of embodiments and exemplifications. However, the present invention is not limited to such embodiments and exemplifications. The present invention may be arbitrary modified and embodied without departing from the scope of claims of the present invention and equivalents thereof. In the present description, "(meth)acryl-" means "acryl-" or "methacryl-". A "positive electrode active material" means an electrode active material for a positive electrode. A "negative electrode active material" means an electrode active material for a negative electrode. A "positive electrode active material layer" means an electrode active material layer provided to a positive electrode. A "negative electrode active material layer" means an electrode active material layer provided to a negative electrode.

[1. Binder Composition for Negative Electrode of Secondary Battery]

The binder composition for a negative electrode of a secondary battery according to the present invention includes a particulate binder and a specific water-soluble polymer.

[1-1. Particulate Binder]

The particulate binder (which may be simply referred to hereinbelow as a "binder") contained in the binder composition according to the present invention is a component for binding an electrode active material to a current collector surface at the negative electrode. In the negative electrode according to the present invention, the binder binds the negative electrode active material, whereby removal of the negative electrode active material from the negative electrode active material layer can be suppressed. Usually, the binder also binds particles other than particles of a negative electrode active material contained in a negative electrode active material layer and plays a role in maintaining the strength of the negative electrode active material layer.

As the binder, it is preferable to use a material having high ability to hold the negative electrode active material and high adhesion property to the current collector. As the binder, a polymer is usually used. The polymer as the material of the binder (which may be simply referred to hereinbelow as a "binder polymer") may be a homopolymer or a copolymer. Of these, a polymer containing an aliphatic conjugated diene monomer unit is preferable. The aliphatic conjugated diene monomer unit is a flexible repeating unit having a low rigidity. Therefore, when a polymer containing the aliphatic conjugated diene monomer unit is used as the material of the binder, sufficient adhesion between the negative electrode active material layer and the current collector can be obtained.

The aliphatic conjugated diene monomer unit is a repeating unit obtained by polymerization of an aliphatic conjugated diene monomer. Examples of the aliphatic conjugated diene monomer may include 1,3-butadiene, 2-methyl-1,3-butadiene, 2,3-dimethyl-1,3-butadiene, 2-chloro-1,3-butadiene, substituted straight-chain conjugated pentadienes, and substituted and side-chain conjugated hexadienes. Of these, 1,3-butadiene is preferable.

The monomer composition for producing the binder polymer may contain only one species of aliphatic conjugated diene monomer or two or more species thereof in combination at any ratio. Therefore, the binder polymer may contain solely one species of aliphatic conjugated diene monomer unit, or two or more species thereof in combination at any ratio.

The ratio of the aliphatic conjugated diene monomer unit in the binder polymer is preferably 20% by weight or more and more preferably 30% by weight or more, and is preferably 70% by weight or less, more preferably 60% by weight or less, and particularly preferably 55% by weight or less. When the ratio of the aliphatic conjugated diene monomer unit is set to a value equal to or larger than the aforementioned lower limit, flexibility of the negative electrode can be improved. When the ratio of the aliphatic conjugated diene monomer unit is set to a value equal to or lower than the aforementioned upper limit, sufficient adhesion between the negative electrode active material layer and the current collector can be obtained, and resistance of the electrode against the electrolyte liquid can be improved.

It is preferable that the binder polymer contains an aromatic vinyl monomer unit. The aromatic vinyl monomer is stable, and can lower the solubility of the binder polymer containing the aromatic vinyl monomer unit in an electrolyte liquid, to thereby stabilize the negative electrode active material layer.

The aromatic vinyl monomer unit is a repeating unit obtained by polymerization of an aromatic vinyl monomer. Examples of the aromatic vinyl monomer may include styrene, α-methylstyrene, vinyltoluene, and divinylbenzene. Of these, styrene is preferable.

The monomer composition for producing the binder polymer may contain solely one species of aromatic vinyl monomer or two or more species thereof in combination at any ratio. Therefore, the binder polymer may contain solely one species of aromatic vinyl monomer unit or two or more species thereof in combination at any ratio.

The ratio of the aromatic vinyl monomer unit in the binder polymer is preferably 30% by weight or more and more preferably 35% by weight or more, and is preferably 79.5% by weight or less and more preferably 69% by weight or less. When the ratio of the aromatic vinyl monomer unit is set to a value equal to or larger than the aforementioned lower limit, resistance of the negative electrode for a secondary battery according to the present invention against the electrolyte liquids can be enhanced. When the ratio of the aromatic vinyl monomer unit is set to a value equal to or lower than the aforementioned upper limit, sufficient adhesion property between a negative electrode active material layer and a current collector can be ensured when the slurry composition for a negative electrode according to the present invention is applied onto the current collector.

It is preferable that the binder polymer is a polymer containing both the aliphatic conjugated diene monomer unit and the aromatic vinyl monomer unit. For example, a styrene-butadiene copolymer is preferable.

When an aliphatic conjugated diene monomer and an aromatic vinyl monomer are used for producing the binder polymer, the resulting binder polymer eventually entrains, as residual monomers, an unreacted aliphatic conjugated diene monomer and an unreacted aromatic vinyl monomer. In this case, the amount of the unreacted aliphatic conjugated diene monomer contained in the binder polymer is preferably 50 ppm or less and more preferably 10 ppm or less. The amount of the unreacted aromatic vinyl monomer contained in the binder polymer is preferably 1000 ppm or less and more preferably 200 ppm or less. When the amount of the aliphatic conjugated diene monomer falls within the aforementioned range, surface roughness of the negative electrode caused by foaming and an environmental load of smelling can be prevented upon production of the negative electrode wherein the slurry composition for a negative electrode according to the present invention is applied onto the surface of a current collector and dried. When the amount of the aromatic vinyl monomer falls within the aforementioned range, surface roughness of the negative electrode and an environmental load that may be caused depending on the drying condition can be suppressed, and resistance of the binder polymer against the electrolyte liquids can be enhanced.

It is preferable that the binder polymer contains an ethylenically unsaturated carboxylic acid monomer unit. The ethylenically unsaturated carboxylic acid monomer unit is a repeating unit that has a carboxyl group (—COOH group) that enhances adsorption ability to the negative electrode active material and to the current collector, and that has high strength. Therefore, removal of the negative electrode active material from the negative electrode active material layer can thereby be stably prevented, and strength of the negative electrode can thereby be improved.

The ethylenically unsaturated carboxylic acid monomer unit is a repeating unit that is obtainable by polymerization of an ethylenically unsaturated carboxylic acid monomer. Examples of the ethylenically unsaturated carboxylic acid monomers may include monocarboxylic acids and dicarboxylic acids such as acrylic acid, methacrylic acid, crotonic acid, maleic acid, fumaric acid, and itaconic acid, and anhydrides thereof. Of these, it is preferable to use a monomer selected from the group consisting of acrylic acid, methacrylic acid, itaconic, acid and combinations thereof from the viewpoint of the stability of the slurry composition for a negative electrode according to the present invention.

The monomer composition for producing the binder polymer may contain solely one species of ethylenically unsaturated carboxylic acid monomer or two or more species thereof in combination at any ratio. Therefore, the binder polymer may contain solely one species of ethylenically unsaturated carboxylic acid monomer unit or two or more species thereof in combination at any ratio.

The ratio of the ethylenically unsaturated carboxylic acid monomer unit in the binder polymer is preferably 0.5% by weight or more, more preferably 1% by weight or more, and particularly preferably 2% by weight or more, and is preferably 10% by weight or less, more preferably 8% by weight or less, and particularly preferably 7% by weight or less. When the ratio of the ethylenically unsaturated carboxylic acid monomer unit is set to a value equal to or larger than the aforementioned lower limit, stability of the slurry composition for a negative electrode according to the present invention can be enhanced. When the ratio thereof is set to a value equal to or lower than the aforementioned upper limit, excessive increase in viscosity of the slurry for a negative electrode of the present invention can be prevented, and the slurry can be easily handled.

The binder polymer may contain an optional repeating unit other than the aforementioned repeating units, as long as the effects of the present invention are not significantly impaired. Examples of the monomers corresponding to the aforementioned optional repeating units may include vinyl cyanide-based monomers, unsaturated carboxylic acid alkyl ester monomers, unsaturated monomers containing a hydroxyalkyl group, and unsaturated carboxylic acid amide monomers. One species of them may be solely used, or two or more species thereof may be used in combination at any ratio.

Examples of the vinyl cyanide-based monomers may include acrylonitrile, methacrylonitrile, α-chloroacrylonitrile, and α-ethylacrylonitrile. Of these, acrylonitrile and methacrylonitrile are preferable. One species of them may be solely used, or two or more species thereof may be used in combination at any ratio.

Examples of the unsaturated carboxylic acid alkyl ester monomers may include methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, monomethyl fumarate, monoethyl fumarate, and 2-ethylhexyl acrylate. Of these, methyl methacrylate is preferable. One species of them may be solely used, or two or more species thereof may be used in combination at any ratio.

Examples of the unsaturated monomers containing a hydroxyl alkyl group may include β-hydroxyethyl acrylate, β-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di-(ethylene glycol) maleate, di-(ethylene glycol) itaconate, 2-hydroxyethyl maleate, bis(2-hydroxyethyl) maleate, and 2-hydroxyethylmethyl fumarate. Of these, β-hydroxyethyl acrylate is preferable. One species of them may be solely used, or two or more species thereof may be used in combination at any ratio.

Examples of the unsaturated carboxylic acid amide monomers may include acrylamide, methacrylamide, N-methylolacrylamide, N-methylolmethacrylamide, and N,N-dimethylacrylamide. Of these, acrylamide and methacrylamide are preferable. One species of them may be solely used, or two or more species thereof may be used in combination at any ratio.

Further, the binder polymer may include monomers used for ordinary emulsion polymerization, e.g., ethylene, propylene, vinyl acetate, vinyl propionate, vinyl chloride, vinylidene chloride, etc. One species of them may be solely used, or two or more species thereof may be used in combination at any ratio.

The weight average molecular weight of the binder polymer is preferably 10000 or larger and more preferably 20000 or larger, and is preferably 1000000 or smaller and more preferably 500000 or smaller. When the weight average molecular weight of the binder polymer falls within the aforementioned range, the strength of the negative electrode according to the present invention and the dispersibility of the negative electrode active material can be readily maintained at a desirable level. The weight average molecular weight of a water-insoluble polymer may be calculated as a polystyrene equivalent value by gel permeation chromatography (GPC) using tetrahydrofuran as a developing solvent.

The glass transition temperature of the binder is preferably $-75°$ C. or higher, more preferably $-55°$ C. or higher, and particularly preferably $-35°$ C. or higher, and is usually $40°$ C. or lower, preferably $30°$ C. or lower, more preferably $20°$ C. or lower, and particularly preferably $15°$ C. or lower. When the glass transition temperature of the binder falls within the aforementioned range, the properties of the negative electrode, including the flexibility, bonding property, and winding property, and the adhesion property between the current collector and the negative electrode active material layer, are highly well balanced and thus preferable.

Usually, the binder is in a form of water-insoluble polymeric particles. Therefore, in the slurry composition for a negative electrode according to the present invention, the binder is not dissolved in water, which is a solvent, but is dispersed to be in a form of particles. That a polymer is water-insoluble means that when 0.5 g of the polymer is dissolved in 100 g of water at 25° C., the insoluble amount is 90% by weight or more. That a polymer is water-soluble means that when 0.5 g of the polymer is dissolved in 100 g of water at 25° C., the insoluble amount is less than 0.5% by weight.

The number average particle diameter of the particulate binder is preferably 50 nm or larger and more preferably 70 nm or larger, and is preferably 500 nm or smaller and more preferably 400 nm or smaller. When the number average particle diameter falls within the aforementioned range, the resulting strength and flexibility of the negative electrode can be at a preferable level. Precense of the particles may be readily measured by, e.g., the transmission electron microscope method, a Coulter counter, and the laser diffraction scattering method.

The particulate binder is produced by, e.g., polymerizing a monomer composition containing the aforementioned monomers in an aqueous solvent to form polymeric particles.

The ratio of each monomer contained in the monomer composition is usually set equal to the ratio of each repeating unit (such as the aliphatic conjugated diene monomer unit, the aromatic vinyl monomer unit, and the ethylenically unsaturated carboxylic acid monomer unit) contained in the binder polymer.

There are no particular limitations to the aqueous solvent as long as the binder particles can be dispersed therein. The aqueous solvent is usually selected from aqueous solvents whose boiling point at normal pressure is usually 80° C. or higher and preferably 100° C. or higher, and is usually 350° C. or lower and preferably 300° C. or lower. Examples of the aqueous solvents may be as follows. In the following examples, numerical values in parentheses after each solvent name is a boiling point at normal pressure (unit: ° C.). The fractional portion of the value is rounded or truncated.

Examples of the aqueous solvents may include: water (100); ketones such as diacetone alcohol (169) and γ-butyrolactone (204); alcohols such as ethyl alcohol (78), isopropyl alcohol (82), and normal propyl alcohol (97); glycol ethers such as propylene glycol monomethyl ether (120), methyl cellosolve (124), ethyl cellosolve (136), ethylene glycol tertiary butyl ether (152), butyl cellosolve (171), 3-methoxy-3-methyl-1-butanol (174), ethylene glycol monopropyl ether (150), diethylene glycol monobutyl ether (230), triethylene glycol monobutyl ether (271), and dipropylene glycol monomethyl ether (188); and ethers such as 1,3-dioxolane (75), 1,4-dioxolane (101), and tetrahydrofuran (66). Of these, water is particularly preferable because water is non-flammable and a dispersion of the binder particles can be readily obtained. With water that is used as a main solvent, an aqueous solvents other than water among the aforementioned solvents may be mixed at an amount within a range in which the dispersed state of the particles of the binder can be secured.

There are no particular limitations to the polymerization method. For example, a solution polymerization method, a suspension polymerization method, a bulk polymerization method, an emulsion polymerization method, and any other polymerization methods may be used. As the polymerization method, any polymerization methods, such as ion polymerization, radical polymerization, and living radical polymerization, may be used. Of these, the emulsion polymerization method is particularly preferable because of its ability to easily produce a polymer having a high molecular weight, and from the viewpoint of manufacturing efficiency in terms of, e.g., that re-dispersion treatment is unnecessary since the obtained polymer as it is may be in a dispersion state in water, and the polymer as it is may be subjected to the production of the slurry composition for a negative electrode of the present invention.

The emulsion polymerization method is usually performed in accordance with a conventional method, e.g., a method described in "*Jikken Kagaku Koza* (Course of Experimental Chemistry)", Vol. 28 (published by Maruzen Publishing Co., Ltd., edited by The Chemical Society of Japan). This method is a method in which water, additives such as a dispersing agent, an emulsifier and a crosslinking agent, a polymerization initiator, and monomers are placed so that the mixture has a predetermined composition in a hermetically sealed vessel equipped with a stirrer and a heating device; the composition in the vessel is stirred to emulsify the monomers and the like in water; and the temperature is increased while the components are stirred, so as to initiate polymerization. Alternatively, the method may be a method in which the composition is emulsified and then placed in a hermetically sealed vessel, and the reaction is initiated in a similar manner.

Examples of the polymerization initiators may include: organic peroxides such as lauroyl peroxide, diisopropyl peroxydicarbonate, di-2-ethylhexyl peroxydicarbonate, t-butyl peroxypivalate, and 3,3,5-trimethylhexanoyl peroxide; azo compounds such as $\alpha,\alpha'$-azobisisobutyronitrile; ammonium persulfate; and potassium persulfate. As the polymerization initiator, one species thereof may be solely used, or two or more species thereof may be used in combination at any ratio.

The emulsifier, the dispersing agent, and the polymerization initiator, etc. are those generally used in these polymerization methods. Usually, the using amount thereof is set to general using amount. In the polymerization, seed polymerization employing seed particles may be performed.

Polymerization temperature and polymerization time may be arbitrary set depending on, e.g., the polymerization method and the type of a polymerization initiator. Usually, the polymerization temperature is approximately 30° C. or higher, and the polymerization time is approximately 0.5 hours to 30 hours.

Additives such as amines may also be used as an auxiliary agent for polymerization.

The aqueous dispersion of the binder particles obtained by the aforementioned method may be subjected to pH adjustment to be in a range of usually 5 to 10, and preferably 5 to 9 by, e.g., mixing the dispersion with an aqueous basic solution containing, e.g., a hydroxide of an alkali metal (for example, Li, Na, K, Rb, and Cs), ammonia, an inorganic ammonium compound (for example, $NH_4Cl$), or an organic amine compound (for example, ethanolamine and diethylamine). Of these, pH adjustment using an alkali metal hydroxide is preferable since thereby the bonding property (peel strength) between the current collector and the negative electrode active material is improved.

The particulate binder may be composite polymer particles composed of two or more types of polymers. The composite polymer particles may be obtained by polymerizing one or more types of monomer component in an ordinary manner, and subsequently polymerizing one or more other types of monomer component in an ordinary manner (two-stage polymerization method). By polymerizing monomers in stages, it is possible to obtain particles of a core-shell structure with a core layer present inside the particles and a shell layer covering the core layer.

[1-2. Water-soluble Polymer]

The binder composition for a negative electrode of a secondary battery according to the present invention contains a water-soluble polymer with an acidic functional group (which may be simply referred to hereinbelow as a "water-soluble polymer").

The water-soluble polymer containing an acidic functional group may be prepared by polymerizing an acidic functional group-containing monomer and, if necessary, a monomer composition containing another optional monomer. By such a method for water-soluble polymer preparation, a water-soluble polymer containing an acidic functional group-containing monomer unit can be obtained, and the obtained water-soluble polymer may be used in the binder composition according to the present invention.

The acidic functional group-containing monomer is a monomer including an acidic functional group. Examples of the acidic functional groups may include a carboxyl group (—COOH), a sulfonic acid group (—SO$_3$H), and a phosphoric acid group (—PO$_3$H$_2$).

Examples of the acidic functional group-containing monomers may include carboxyl group-containing monomers, sulfonic acid group-containing monomers, and phosphoric acid group-containing monomers. Of these, a carboxyl group-containing monomer is particularly preferable.

The carboxyl group-containing monomer may be a monomer containing a carboxyl group and a polymerizable group. Specific examples of the carboxyl group-containing monomer may include an ethylenically unsaturated carboxylic acid monomer.

Examples of the ethylenically unsaturated carboxylic acid monomers may include ethylenically unsaturated monocarboxylic acids and derivatives thereof, and ethylenically unsaturated dicarboxylic acids, acid anhydrides thereof, and derivatives thereof. Examples of the ethylenically unsaturated monocarboxylic acids may include acrylic acid, methacrylic acid, and crotonic acid. Examples of the ethylenically unsaturated monocarboxylic acid derivatives may include 2-ethylacrylic acid, isocrotonic acid, α-acetoxyacrylic acid, β-trans-aryloxyacrylic acid, α-chloro-β-E-methoxyacrylic acid, and β-diaminoacrylic acid. Examples of the ethylenically unsaturated dicarboxylic acids may include maleic acid, fumaric acid, and itaconic acid. Examples of the ethylenically unsaturated dicarboxylic acid anhydrides may include maleic anhydride, acrylic anhydride, methylmaleic anhydride, and dimethylmaleic anhydride. Examples of the ethylenically unsaturated dicarboxylic acid derivatives may include: methylallyl maleates such as methylmaleic acid, dimethylmaleic acid, phenylmaleic acid, chloromaleic acid, dichloromaleic acid, and fluoromaleic acid; and maleates such as diphenyl maleate, nonyl maleate, decyl maleate, dodecyl maleate, octadecyl maleate, and fluoroalkyl maleate. Of these, ethylenically unsaturated monocarboxylic acids such as acrylic acid and methacrylic acid are preferable since these types of ethylenically unsaturated monocarboxylic acids enhance the dispersibility of the obtained water-soluble polymer in water.

The ratio of the carboxyl group-containing monomer unit in the water-soluble polymer is preferably 20% by weight or more and more preferably 25% by weight or more, and is preferably 70% by weight or less and more preferably 65% by weight or less. When the amount of the carboxyl group-containing monomer unit is set to a value equal to or larger than the aforementioned lower limit, the adhesion strength between the current collector and the negative electrode active material layer is improved. When the amount is set to a value equal to or lower than the upper limit, the durability such as the high-temperature cycle property and the high-temperature storage property are improved.

Examples of the sulfonic acid group-containing monomers may include sulfonic acid group-containing monomers that does not have a functional group other than a sulfonic acid group or salts thereof, monomers containing an amido group and a sulfonic acid group or salts thereof, and monomers containing a hydroxyl group and a sulfonic acid group or salts thereof. One species of them may be solely used, or two or more species thereof may be used in combination at any ratio. Therefore, the water-soluble polymer may contain solely one species of sulfonic acid group-containing monomer unit or two or more species thereof in combination at any ratio.

Examples of the sulfonic acid group-containing monomers that does not have a functional group other than a sulfonic acid group may include monomers produced by sulfonating one of conjugated double bonds of diene compounds such as isoprene and butadiene, vinylsulfonic acid, styrenesulfonic acid, allylsulfonic acid, sulfoethyl methacrylate, sulfopropyl methacrylate, and sulfobutyl methacrylate. Examples of the salts thereof may include lithium salts, sodium salts, and potassium salts. One species of them may be solely used, or two or more species thereof may be used in combination at any ratio.

Examples of the monomers including an amido group and a sulfonic acid group may include 2-acrylamide-2-methylpropanesulfonic acid (AMPS). Examples of the salts thereof may include lithium salts, sodium salts, and potassium salts. One species of them may be solely used, or two or more species thereof may be used in combination at any ratio.

Examples of the monomers including a hydroxyl group and a sulfonic acid group may include 3-allyloxy-2-hydroxypropane sulfonic acid (HAPS). Examples of the salts thereof may include lithium salts, sodium salts, and potassium salts. One species of them may be solely used, or two or more species thereof may be used in combination at any ratio.

Of these, styrene sulfonic acid, 2-acrylamide-2-methylpropanesulfonic acid (AMPS), and monomers including an amido group and a sulfonic acid or salts thereof are preferable as the sulfonic acid group-containing monomers.

The ratio of the sulfonic acid group-containing monomer unit in the water-soluble polymer is preferably 2% by weight or more, and is preferably 15% by weight or less, more preferably 10% by weight or less, and particularly preferably 8% by weight or less. When the existence density of a sulfonic acid group contained in the water-soluble polymer increases, the dispersibility of the slurry for a negative electrode is improved. When producing the negative electrode according to the present invention, a crosslinking reaction of a sulfonic acid group usually occurs. Therefore, a crosslinking structure is formed by the sulfonic acid group in the negative electrode active layer. In this case, when the water-soluble polymer contains a sulfonic acid group in a sufficient amount, a large number of the crosslinking structures can enhance the strength of the negative electrode active material layer. Further, the high-temperature storage property and low-temperature output property of the secondary battery can be thereby improved. Accordingly, as described above, it is preferable that the water-soluble polymer contains a large amount of the sulfonic acid group-containing monomer unit. However, when the amount of the sulfonic acid group-containing monomer unit is too large, the contents of other monomer units decreases relatively, and the adsorption of the water-soluble polymer to the negative electrode active material and its strength can decrease. Thus, it is preferable that the amount of the sulfonic acid group-containing monomer unit is equal to or lower than the aforementioned upper limit.

Examples of the phosphoric acid groups that may be contained in the phosphoric acid group-containing monomer may include monomers with a group -O—P(=O)(—OR$^4$)—OR$^5$ group (where R$^4$ and OR$^5$ are independently a hydrogen atom or any organic group) or salts thereof. Specific examples of the organic group denoted by R$^4$ and R$^5$ may include aliphatic groups such as an octyl group, and aromatic groups such as a phenyl group.

Examples of the phosphoric acid group-containing monomers may include compounds containing a phosphoric acid group and an allyloxy group and phosphoric acid group-containing (meth)acrylic acid esters. Examples of the compounds containing a phosphoric acid group and an allyloxy group may include 3-allyloxy-2-hydroxypropanephosphoric acid. Examples of the phosphoric acid group-containing (meth)acrylic acid esters may include dioctyl-2-methacryloyloxyethyl phosphate, diphenyl-2-methacryloyloxyethyl phosphate, monomethyl-2-methacryloyloxyethyl phosphate, dimethyl-2-methacryloyloxyethyl phosphate, monoethyl-2-methacryloyloxyethyl phosphate, diethyl-2-methacryloyloxyethyl phosphate, monoisopropyl-2-methacryloyloxyethyl phosphate, diisopropyl-2-methacryloyloxyethyl phosphate, mono-n-butyl-2-methacryloyloxyethyl phosphate, di-n-butyl-2-methacryloyloxyethyl phosphate, monobutoxyethyl-2-methacryloyloxyethyl phosphate, dibutoxyethyl-2-methacryloyloxyethyl phosphate, mono(2-ethylhexyl)-2-methacryloyloxyethyl phosphate, and di(2-ethylhexyl)-2-methacryloyloxyethyl phosphate.

As the phosphoric acid group-containing monomer, one species thereof may be solely used, or two or more species thereof may be used in combination at any ratio. Therefore, the water-soluble polymer may contain solely one species of phosphoric acid group-containing monomer unit or two or more species thereof in combination at any ratio.

The ratio of the phosphoric acid group-containing monomer unit in the water-soluble polymer is preferably 5% by weight or more and preferably 10% by weight or more, and is preferably 30% by weight or less and more preferably 25% by weight or less. When the amount of the phosphoric acid group-containing monomer unit is set to a value equal to or larger than the aforementioned lower limit, it is possible to provide the effects derived from the phosphoric acid group-containing monomer unit such as improved adhesion property between the current collector and the negative electrode active material layer. When the amount thereof is set to a value equal to or lower than the aforementioned upper limit, the water-soluble polymer can be produced with an appropriate polymerization degree, thereby preventing occurrence of undesirable effects such as a decrease in the durability.

As the acidic functional group-containing monomer, one species thereof may be solely used, or two or more species thereof may be used in combination at any ratio. Therefore, the water-soluble polymer according to the present invention may contain solely one species of acidic functional group-containing monomer unit or two or more species thereof in combination at any ratio.

In an embodiment where the water-soluble polymer contains two or more types of acidic functional group-containing monomer units, it is preferable that the water soluble polymer contains a carboxyl group-containing monomer and a sulfonic acid-containing monomer in combination. More specifically, it is preferable that the water-soluble polymer contains methacrylic acid and 2-acrylamide-2-methylpropanesulfonic acid.

The ratio of the acidic functional group-containing monomer unit in the water-soluble polymer is preferably 25% by weight or more and more preferably 30% by weight or more, and is preferably 60% by weight or less, more preferably 55% by weight or less, and particularly preferably 50% by weight or less. When the ratio of the acidic functional group-containing monomer unit is set to a value equal to or larger than the aforementioned lower limit, its electrostatic repulsion with electrode active materials enhances the dispersibility to a preferable level. When the ratio of the acidic functional group-containing monomer unit is set to a value equal to or lower than the aforementioned upper limit, excessive contact between the functional group and the electrolyte liquid is avoided, thereby improving the durability.

In addition to the acidic functional group-containing monomer unit, the water-soluble polymer may contain other optional units. Examples of the optional units may include crosslinkable monomer units, fluorine-containing (meth) acrylic acid ester monomer units, reactive surfactant units, and combinations thereof. These units are repeating units that are obtainable by polymerizing a crosslinkable monomer, a fluorine-containing (meth)acrylic acid, ester monomer, and a reactive surfactant monomer, respectively.

As the crosslinkable monomer, a monomer that can form a crosslinking structure as a result of polymerization. Examples of the crosslinkable monomers may include monomers with at least two reactive groups per molecule. More specifically, examples of the crosslinkable monomers may include: monofunctional monomers with a thermally crosslinkable group and one olefinic double bond per molecule; and multi-functional monomers with at least two olefinic double bonds per molecule.

Examples of the thermally crosslinkable groups contained in the monofunctional monomer may include an epoxy group, an N-methylolamido group, an oxetanyl group, an oxazoline group, and combinations thereof. Of these, an epoxy group is preferable because therewith crosslinking and crosslinking density are easily adjustable.

Examples of the crosslinkable monomers that have an epoxy group as a thermally crosslinkable group and an olefinic double bond may include: unsaturated glycidyl ethers such as vinyl glycidyl ether, allyl glycidyl ether, butenyl glycidyl ether, and o-allylphenyl glycidyl ether; monoepoxides of dienes or polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acid such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of the crosslinkable monomers that have an N-methylolamido group as a thermally crosslinkable group and an olefinic double bond may include (meth)acrylamides with a methylol group such as N-methylol(meth)acrylamide.

Examples of the crosslinkable monomers that have an oxetanyl group as a thermally cross-linkable group and an olefinic double bond may include 3-((meth)acryloyloxymethyl)oxetane, 3-((meth)acryloyloxymethyl)-2-trifluoromethyloxetane, 3-((meth)acryloyloxymethyl)-2-phenyloxetane, 2-((meth)acryloyloxymethyl)oxetane, and 2-((meth)acryloyloxymethyl)-4-trifluoromethyloxetane.

Examples of the crosslinkable monomers that have an oxazoline group as a thermally crosslinkable group and an olefinic double bond may include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of the multi-functional monomers that have at least two olefinic double bonds may include: allyl (meth)acrylate, ethylene di(meth)acrylate, diethylene glycol di(meth)acrylate, triethylene glycol di(meth)acrylate, tetraethylene glycol di(meth)acrylate, trimethylolpropane-tri(meth)acrylate, dipropylene glycol diallyl ether, polyglycol diallyl ether, triethylene glycol divinyl ether, hydroquinone diallyl ether, tetra allyloxy ethane, trimethylolpropane-diallyl ether, allyls or vinyl ethers of multifunctional alcohols other than the foregoing, triallylamine, methylenebisacrylamide, and divinylbenzene.

In particular, as a crosslinkable monomer, ethylene dimethacrylate, allyl glycidyl ether, and glycidyl methacrylate may be preferably used.

The ratio of the crosslinkable monomer unit in the water-soluble polymer is preferably 0.1% by weight or more, more preferably 0.2% by weight or more, and particularly preferably 0.5% by weight or more, and is preferably 2% by weight or less, more preferably 1.5% by weight or less, and particularly preferably 1% by weight or less. When the ratio of the crosslinkable monomer unit is set to a value equal to or larger than the aforementioned lower limit, the molecular weight of the water-soluble polymer can be increased, and an excessive increase in the swelling degree can be prevented. When the ratio of the crosslinkable monomer unit is set to a value equal to or lower than the aforementioned upper limit, the solubility of the water-soluble polymer in water is enhanced, whereby the dispersibility can be maintained at a preferable level. Therefore, when the ratio of the crosslinkable monomer unit in the water-soluble polymer is set within the aforementioned range, the swelling degree and dispersibility of the water-soluble polymer can simultaneously be set at a preferable level.

Examples of the fluorine-containing (meth)acrylic acid ester monomers may include a monomer represented by the following formula (I):

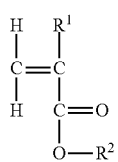

(I)

In the aforementioned formula (I), $R^1$ represents a hydrogen atom or a methyl group.

In the aforementioned formula (I), $R^2$ represents a hydrocarbon group containing a fluorine atom. The carbon number of the hydrocarbon group is usually equal to or greater than 1 and equal to or smaller than 18. The number of the fluorine atom contained in $R^2$ may be 1 or 2 or more.

Examples of the fluorine-containing (meth)acrylic acid ester monomer represented by the formula (I) may include fluorinated alkyl (meth)acrylate, fluorinated aryl (meth)acrylate, and fluorinated aralkyl (meth)acrylate. Of these, fluorinated alkyl (meth)acrylate is preferable. Specific examples of such monomers may include: (meth)acrylic acid perfluoroalkyl esters such as 2,2,2-trifluoroethyl (meth)acrylate, β-(perfluorooctyl)ethyl (meth)acrylate, 2,2,3,3-tetrafluoropropyl (meth)acrylate, 2,2,3,4,4,4-hexafluorobutyl (meth)acrylate, 1H,1H,9H-perfluoro-1-nonyl (meth)acrylate, 1H,1H,11H-perfluoroundecyl (meth)acrylate, perfluorooctyl (meth)acrylate, and 3[4[1-trifluoromethyl-2,2-bis[bis(trifluoromethyl)fluoromethyl]ethynyloxy]benzoxy]2-hydroxypropyl (meth)acrylate.

As the fluorine-containing (meth)acrylic acid ester monomer, one species thereof may be solely used, or two or more species thereof may be used in combination at any ratio. Therefore, the water-soluble polymer according to the present invention may contain solely one species of the fluorine-containing (meth)acrylic acid ester monomer unit or two or more species thereof in combination at any ratio.

The ratio of the fluorine-containing (meth)acrylic acid ester monomer unit in the water-soluble polymer is preferably 1% by weight or more, more preferably 2% by weight or more, and particularly preferably 5% by weight or more, and is preferably 20% by weight or less, more preferably 15% by weight or less, and particularly preferably 10% by weight or less. When the ratio of the fluorine-containing (meth)acrylic acid ester monomer unit is set to a value equal to or larger than the aforementioned lower limit, the water-soluble polymer can have a repulsive force against the electrolyte liquid, and the swelling degree can be adjusted within an appropriate range. When the ratio of the fluorine-containing (meth)acrylic acid ester monomer unit is set to a value equal to or lower than the aforementioned upper limit, the water-soluble polymer can have wettability against the electrolyte liquid, and the low-temperature output property can be improved. Further, when the ratio of the fluorine-containing (meth)acrylic acid ester monomer unit is set within the aforementioned range, the ion conductivity of the water-soluble polymer can be adjusted within an appropriate range.

The reactive surfactant monomer is a monomer having a polymerizable group that is copolymerizable with another monomer and also has a surfactant group (a hydrophilic group and a hydrophobic group). The reactive surfactant unit that is obtainable by polymerization of a reactive surfactant monomer may constitute a part of a molecule of the water-soluble polymer and act as a surfactant.

Usually, a reactive surfactant monomer has a polymerizable unsaturated group. After polymerization, this group also acts as a hydrophobic group. Examples of the polymerizable unsaturated groups contained in the reactive surfactant monomer may include a vinyl group, an allyl group, a vinylidene group, a propenyl group, an isopropenyl group, and an isobutylidene group. Number of the species of the aforementioned polymerizable unsaturated groups may be one, or may be two or more.

The reactive surfactant monomer usually has a hydrophilic group as a portion that exerts hydrophylicity. Depending on the type of the hydrophilic group, the reactive surfactant monomers are classified into anionic, cationic, and nonionic surfactants.

Examples of the anionic hydrophilic groups may include —$SO_3M$, —COOM, and —$PO(OH)_2$, where M denotes a hydrogen atom or a cation. Examples of the cations may include: alkali metal ions such as lithium, sodium, and potassium; alkaline earth metal ions such as calcium and magnesium; an ammonium ion; ammonium ions of alkylamines such as monomethylamine, dimethylamine, monoethylamine, and triethylamine; and ammonium ions of alkanolamines such as monoethanolamine, diethanolamine, and triethanolamine.

Examples of the cationic hydrophilic groups may include —Cl, —Br, —I, and —$SO_3OR^X$, where $R^X$ denotes an alkyl group. Examples of $R^X$ may include a methyl group, an ethyl group, a propyl group, and an isopropyl group.

Examples of the nonionic hydrophilic groups may include —OH.

Examples of preferable reactive surfactant monomers may include monomers represented by the following formula (II):

(II)

In the formula (II), R represents a bivalent bonding group. Examples of R may include a —Si—O— group, a methylene group, and a phenylene group. In the formula (II), $R^3$ represents a hydrophilic group. Examples of $R^3$ may include —$SO_3NH_4$. In the formula (II), n is an integer equal to or larger than 1 and equal to or smaller than 100.

Other examples of the preferable reactive surfactants may include compounds that have an ethylene oxide-based polymeric unit and a butylene oxide-based polymeric unit and have, at a terminal thereof, —$SO_3NH_4$ and an alkenyl group with a terminal double bond (for example, "LATEMUL PD-104" manufactured by Kao Corporation).

As the reactive surfactant monomer, one species thereof may be solely used, or two or more species thereof may be used in combination at any ratio.

The ratio of the reactive surfactant unit in the water-soluble polymer is preferably 0.1% by weight or more, more preferably 0.2% by weight or more, and particularly preferably 0.5% by weight or more, and is preferably 15% by weight or less, more preferably 10% by weight or less, and particularly preferably 5% by weight or less. When the ratio of the reactive surfactant unit is set to a value equal to or larger than the aforementioned lower limit, the dispersibility of the slurry composition for a negative electrode can be improved. When the ratio of the reactive surfactant unit is set to a value equal to or lower than the aforementioned upper limit, the durability of the negative electrode can be improved.

Examples of the optional units that may be contained in the water-soluble polymer may include not only the aforementioned crosslinkable monomer units, fluorine-containing (meth)acrylic acid ester monomer units, reactive surfactant units, but also other units. Specific examples thereof may include (meth)acrylic acid ester monomer units other than fluorine-containing (meth)acrylic acid ester monomer units. A (meth)acrylic acid ester monomer unit is a repeating unit that is obtainable by polymerization of a (meth)acrylic acid ester monomer. However, (meth)acrylic acid ester monomers containing fluorine are defined as fluorine-containing (meth)acrylic acid ester monomers which are differentiated from (meth)acrylic acid ester monomers.

Examples of the (meth)acrylic acid ester monomers may include: acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

As the (meth)acrylic acid ester monomer, one species thereof may be solely used, or two or more species thereof may be used in combination at any ratio. Therefore, the water-soluble polymer according to the present invention may contain solely one species of (meth)acrylic acid ester monomers or two or more species thereof in combination at any ratio.

The ratio of the (meth)acrylic acid ester monomer unit in the water-soluble polymer according to the present invention is preferably 30% by weight or more, more preferably 35% by weight or more, and particularly preferably 40% by weight or more, and is preferably 70% by weight or less.

When the amount of the (meth)acrylic acid ester monomer unit is set to a value equal to or larger than the aforementioned lower limit, the adhesion property of the negative electrode active material to a current collector can be enhanced. When the amount thereof is set to a value equal to or lower than the aforementioned upper limit, the flexibility of the negative electrode can be enhanced.

Other examples of the optional units that may be contained in the water-soluble polymer may include units that are obtainable by polymerization of the following monomers: styrene-based monomers such as styrene, chlorostyrene, vinyltoluene, t-butylstyrene, vinylbenzoic acid, methyl vinylbenzoate, vinylnaphthalene, chloromethylstyrene, hydroxymethylstyrene, α-methylstyrene, and divinylbenzene; amide monomers such as acrylamide and acrylamide-2-methylpropane sulfonic acid; α,β-unsaturated nitrile compound monomers such as acrylonitrile and methacrylonitrile; olefin monomers such as ethylene and propylene; halogen atom-containing monomers such as vinyl chloride and vinylidene chloride; vinyl ester monomers such as vinyl acetate, vinyl propionate, vinyl butyrate, and vinyl benzoate; vinyl ether monomers such as methyl vinyl ether, ethyl vinyl ether, and butyl vinyl ether; and vinyl ketone monomers such as methyl vinyl ketone, ethyl vinyl ketone, butyl vinyl ketone, hexyl vinyl ketone, and isopropenyl vinyl ketone; as well as units that are obtainable by polymerization of at least one heterocyclic ring-containing vinyl compound monomer such as N-vinylpyrrolidone, vinylpyridine, and vinylimidazole. The ratio of the aforementioned units in the water-soluble polymer is preferably 0% by weight to 10% by weight and more preferably 0% by weight to 5% by weight.

The weight average molecular weight of the water-soluble polymer is usually smaller than that of the polymer used as a binder. The weight average molecular weight is preferably 100 or larger, more preferably 500 or larger, and particularly preferably 1000 or larger, and is preferably 500000 or smaller, more preferably 250000 or smaller, and particularly preferably 100000 or smaller. When the weight average molecular weight of the water-soluble polymer is set to a value equal to or larger than the aforementioned lower limit, the strength of the water-soluble polymer can be increased, whereby a stable protective layer that covers the negative electrode active material can be formed, which enables improvement of, e.g., dispersibility of the negative electrode active material and high-temperature storage property of the secondary battery. When the weight average molecular weight is set to a value equal to or lower than the aforementioned upper limit, the water-soluble polymer can be made flexible, which enables, e.g., suppression of swelling of the negative electrode and improvement of the adhesion property of the negative electrode active material layer to the current collector. The weight average molecular weight of the water-soluble polymer may be determined as a polystyrene equivalent value by GPC, using as a developing solvent a solution produced by dissolving 0.85 g/ml of sodium nitrate in an aqueous solution of 10 vol % of dimethylformamide.

The glass transition temperature of the water-soluble polymer is usually 0° C. or higher and preferably 5° C. or higher, and is usually 100° C. or lower and preferably 50° C. or lower. When the glass transition temperature of the water-soluble polymer falls within the aforementioned range, the adhesion property and flexibility of the negative electrode can be simultaneously achieved. The glass transition temperature of the water-soluble polymer may be adjusted by combining a variety of monomers.

In the present invention, the ion conductivity of the water-soluble polymer is from $1\times10^{-5}$ to $1\times10^{-3}$ S/cm. In the present application, the "ion conductivity of the water-soluble polymer" refers to an ion conductivity measured under the predetermined conditions as follows. An aqueous solution of the water-soluble polymer is poured into a silicon container and dried at room temperature for 72 hours so that the thickness thereof after being dried is 1 mm, to produce a 1 cm×1 cm square film. The film thus produced is immersed into a 1.0 mol/L $LiPF_6$ solution (solvent: a mixture of ethylene carbonate/diethyl carbonate at a volume ratio of 1/2) at 60° C. for 72 hours. The thickness (d) of the film after the immersion is measured, and then the film is placed in between two copper foils. The resistance R is measured from an alternating current impedance in the range of 0.001 to 1000000 Hz, so that the ion conductivity=R×1/d is calculated. In the present application, this value is referred to as the "ion conductivity of the water-soluble polymer". By setting the ion conductivity of the water-soluble polymer to a value equal to or larger than $1\times10^{-5}$ S/cm, the low-temperature output property can be improved. When the ion conductivity is set to a value equal to or lower than $1\times10^{-3}$ S/cm, the adhesion property can be improved, and in turn the durability can be improved. When the ion conductivity is larger than $1\times10^{-3}$ S/cm, the swelling degree of the water-soluble polymer to the electrolyte liquid becomes too large, and the product life property can be shortened. The value of the ion conductivity is preferably $2\times10^{-5}$ to $1\times10^{-3}$ S/cm and more preferably $5\times10^{-5}$ to $1\times10^{-3}$ S/cm. The ion conductivity of the water-soluble polymer may be set within the aforementioned range by appropriately adjusting the types and the ratio of the respective monomer units contained in the water-soluble polymer.

In the present invention, the swelling degree of the water-soluble polymer measured under the predetermined conditions is 1.0 to 2.0 times the value of the particulate binder measured under the same conditions. The swelling degree is a swelling degree to a liquid with a solubility parameter of 8 to 13 $(cal/cm^3)^{1/2}$.

More specifically, each of an aqueous dispersion of the particulate binder and an aqueous solution of the water-soluble polymer is poured into a silicon container and dried at room temperature for 72 hours so that the thickness thereof after being dried is 1 mm, to produce a 1 cm×1 cm square film, and a weight M0 is measured. The film thus produced is immersed into the specific liquid at 60° C. for 72 hours, and then a weight M1 of the film after immersion is measured. The swelling degree is calculated from (M1−M0)/M0. From the swelling degree V0 of the particulate binder and the swelling degree V1 of the water-soluble polymer, the ratio V1/V0 is calculated. When this ratio falls within the range of 1.0 to 2.0, the swelling degree requirement according to the present invention is satisfied. When V1/V0 is set to a value equal to or larger than 1.0, the distance between active materials increases, and the electron movement resistance increases, whereby the low-temperature output property can be improved. When V1/V0 is set to a value equal to or lower than 2.0, the distance between active materials can be in an appropriate narrow range, whereby the durability can be made preferable.

The value of the ratio of the swelling degree V1/V0 is preferably 1.0 to 1.5 and more preferably 1.0 to 1.2. The ratio of the swelling degree may be set within the aforementioned range by appropriately adjusting the types and the ratio of the respective monomer units contained in the particulate binder and the types and the ratio of the respective monomer units contained in the water-soluble polymer.

Specifically, as the liquid with the specific solubility parameter for measuring the swelling degree, it is possible to use a liquid similar to the electrolyte liquid of the secondary battery according to the present invention. Those which satisfy the aforementioned requirements for the swelling degree in a liquid that has a solubility parameter in the range of 8 to 13 $(cal/cm^3)^{1/2}$ are deemed to satisfy the requirements for the swelling degree according to the present invention. More specifically, 1.0 mol/L of a $LiPF_6$ solution (solvent: a mixture of ethylene carbonate/diethyl carbonate at a volume ratio of 1/2 and a solubility parameter of 10.8 $(cal/cm^3)^{1/2}$) may be used as a solution for measuring the swelling degree.

There are no particular limitations to the values of the swelling degree of the particulate binder V0 and the swelling degree of the water-soluble polymer V1. However, it is preferable that each of the values of V0 and V1 is in a range as follows. That is, the swelling degree of the particulate binder V0 is preferably 1.0 time to 3.0 times and more preferably 1.0 time to 2.0 times. The swelling degree of the water-soluble polymer V1 is preferably 1.0 time to 5.0 times, and more preferably 1.0 time to 4.0 times.

The water-soluble polymer may be produced in any production method. For example, the water-soluble polymer may be produced by polymerizing, in an aqueous solvent, a monomer composition containing an acidic functional group-containing monomer, and, if necessary, another monomer which gives another optional unit.

The ratio of the respective monomers contained in the monomer composition is usually equal to the ratio of the respective repeating units (for example, an acidic functional group-containing monomer unit, a crosslinkable monomer unit, a fluorine-containing (meth)acrylic acid ester monomer unit, and a reactive surfactant unit) in the water-soluble polymer.

The aqueous solvent and polymerization methodmay be the same as, e.g., those used for the binder production. In this manner, an aqueous solution in which the water-soluble polymer is dissolved in an aqueous solvent is usually obtained. The water-soluble polymer may be isolated from the aqueous solution thus produced. However, usually, the water-soluble polymer in a state of being dissolved in an aqueous solvent may be used for producing the slurry composition for a negative electrode, and the slurry composition for a negative electrode may be used for producing the negative electrode.

The aforementioned aqueous solution, in which the water-soluble polymer is contained in an aqueous solvent, is usually acidic. If necessary, the aqueous solution may be alkalized to the value in a range of pH7 to pH13. By the alkalization, the handling ability of the aqueous solution can be improved, and the application capability of the slurry composition for a negative electrode can be improved. Examples of the methods for alkalizing the solution to a value in a range of pH 7 to 13 may include a method of adding an alkaline aqueous solution including: an alkali metal aqueous solution such as a lithium hydroxide aqueous solution, a sodium hydroxide aqueous solution, and a potassium hydroxide aqueous solution; an alkaline earth metal aqueous solution such as a calcium hydroxide aqueous solution and a magnesium hydroxide aqueous solution; and an aqueous ammonia solution. As the aforementioned alkaline solutions, one species thereof may be solely used, or two or more species thereof may be used in combination at any ratio.

[1-3. Other Components]

The binder composition for a negative electrode of a secondary battery according to the present invention may consist only of the particulate binder and the water-soluble polymer. However, if necessary, the binder composition may contain another optional component. For example, the binder composition may contain another surfactant in place of or in addition to the reactive surfactant unit. Examples of the usable surfactants may include sodium dodecylbenzenesulfonate.

[1-4. Ratio of Particulate Binder Relative to Water-soluble Polymer]

There are no specific limitations to the containing ratio of the particulate binder and the water-soluble polymer in the binder composition for a negative electrode of a secondary battery according to the present invention. The ratio thereof may be adjusted to the ratio appropriate for preparing the slurry composition for a negative electrode of a secondary battery according to the present invention and the negative electrode for a secondary battery according to the present invention, which will be described later. For example, the weight ratio of (the particulate binder)/(the water-soluble polymer) is preferably 99.5/0.5 to 95/5, more preferably 99/1 to 96/4, and even more preferably 98.5/1.5 to 97/3. When the ratio is set within the aforementioned range, adhesion property between the electrode active material layer and the current collector, and durability of the battery can be simultaneously achieved.

[2. Negative Electrode for Secondary Battery]

The negative electrode for a secondary battery of the present invention (which may be appropriately referred to hereinbelow as the "negative electrode according to the present invention") contains the binder composition for a negative electrode of a secondary battery according to the present invention and a negative electrode active material.

Usually, the negative electrode according to the present invention includes a current collector and a negative electrode active material layer formed on the surface of the current collector, and the electrode active material layer contains the aforementioned binder composition and a negative electrode active material.

[2-1. Negative Electrode Active Material]

The negative electrode active material is an electrode active material for a negative electrode and is a material that donates and accepts an electron in a negative electrode of a secondary battery.

For example, when the secondary battery according to the present invention is a lithium ion secondary battery, a material that can store and release lithium is usually used as a negative electrode active material. Examples of the material that can store and release lithium may include a metal active material, a carbon active material, and an active material obtained by combining these materials.

The metal active material is an active material that contains a metal. Usually, the metal active material is an active material containing in its structure an element capable of being intercalated (or doped) with lithium, and having a theoretical electric capacity of 500 mAh/g or greater per unit weight when the active material is intercalated with lithium. There are no particular limitations to the upper limit of the theoretical electric capacity. The upper limit may be, e.g., 5000 mAh/g or lower. Examples of the metal active materials for use may include: lithium metal; elemental metal capable of forming a lithium alloy, and an alloy thereof; and oxides, sulfides, nitrides, silicides, carbides, and phosphides thereof.

Examples of the elemental metal capable of forming a lithium alloy may include elemental metals such as Ag, Al, Ba, Bi, Cu, Ga, Ge, In, Ni, P, Pb, Sb, Si, Sn, Sr, Zn, and Ti. Examples of the alloy of elemental metal capable of forming a lithium alloy may include compounds containing the aforementioned elemental metals. Of these, silicon (Si), tin (Sn), lead (Pb), and titanium (Ti) are preferable, and silicon, tin, and titanium are more preferable. Therefore, elemental metals such as silicon (Si), tin (Sn), or titanium (Ti), or alloys containing these elemental metals, and compounds of such metals are preferable.

The metal active material may further contain one or more non-metallic elements. Examples thereof may include SiC, $SiO_xC_y$ (0<x≤3, 0≤y≤5), $Si_3N_4$, $Si_2N_2O$, $SiO_x$ (0<x≤2), $SnO_x$ (0<x≤2), LiSiO, and LiSnO. Of these, $SiO_xC_y$ that can be intercalated and deintercalated (i.e., dedoped) with lithium at a low electric potential is preferable. $SiO_xC_y$ may be obtained by, e.g., calcining a polymer material containing silicon. Particularly, $SiO_xC_y$ in a range of 0.8≤x≤3 and 2≤y≤4 is preferably used in view of the balance between the capacity and cycle property.

Examples of the oxide, the sulfide, the nitride, the silicide, the carbide and the phosphide of lithium metal, elemental metal capable of forming a lithium alloy and an alloy thereof may include an oxide, a sulfide, a nitride, a silicide, a carbide, and a phosphide of the element capable of intercalating lithium. Of these, oxides are particularly preferable. Examples of the oxide for use may include a lithium-containing metal complex oxide containing an oxide such as tin oxide, manganese oxide, titanium oxide, niobium oxide, and vanadium oxide, and a metal element selected from the group consisting of Si, Sn, Pb, and Ti atoms.

Further examples of the lithium-containing metal complex oxides may include a lithium-titanium complex oxide represented by $Li_xTi_yM_zO_4$ (wherein 0.7≤x≤1.5, 1.5≤y≤2.3, 0≤z≤1.6, and M is an element selected from the group consisting of Na, K, Co, Al, Fe, Ti, Mg, Cr, Ga, Cu, Zn, and Nb), and a lithium-manganese complex oxide represented by $Li_x Mn_yM_zO_4$ (x, y, z, and M are the same as the definitions in the lithium-titanium complex oxide). Of these, $Li_{4/3}Ti_{5/3}O_4$, $Li_1Ti_2O_4$, $Li_{4/5}Ti_{11/5}O_4$, and $Li_{4/3}Mn_{5/3}O_4$ are preferable.

Of these metal active materials, an active material containing silicon is preferable. Use of the active material containing silicon can increase electric capacity of the secondary battery. In general, the active material containing silicon greatly expands and shrinks (for example, approximately five times) during charging and discharging. However, in the negative electrode of the present invention, reduction in battery performance due to expansion and shrinkage of the active material containing silicon can be prevented by the water-soluble polymer according to the present invention.

Of the active materials containing silicon, SiOx, SiC, and SiOxCy are preferable, and SiOxCy is more preferable. In an active material including a combination of Si and C, intercalation and deintercalation of Li into and from Si (silicon) may occur at a high electric potential, and intercalation and deintercalation of Li into and from C (carbon) may occur at a low electric potential. Therefore, expansion and shrinkage are suppressed as compared to those in other metal active materials, so that the charging-discharging cycle property of the secondary battery can be improved.

The carbon active material is an active material that has carbon main skeleton and that is capable of being intercalated with lithium, and examples thereof may include carbonaceous materials and graphite materials.

The carbonaceous material is generally a carbon material having a low degree of graphitization (that is, low crystallinity) and obtained by subjecting a carbon precursor to heat treatment at 2,000° C. or lower for carbonization. There are no particular limitations to the lower limit of the heat treatment. The lower limit thereof may be, e.g., 500° C. or higher.

Examples of the carbonaceous material may include graphitizable carbon whose carbon structure easily varies depending on the heat treatment temperature, and non-graphitizable carbon having a structure close to an amorphous structure that is typified by glass carbon.

Examples of the graphitizable carbon may include a carbon material that is produced with a raw material that is tar pitch obtained from petroleum or coal. Specific examples thereof may include coke, meso-carbon microbeads (MCMB), mesophase pitch carbon fibers, and thermal decomposition vapor-phase grown carbon fibers. The MCMBs are carbon fine particles obtained by separating and extracting mesophase microspheres that have been generated in the process of heating pitch materials at approximately 400° C. The mesophase pitch carbon fibers are carbon fibers produced with a raw material mesophase pitch that has been obtained by growth and coalescence of the mesophase microspheres. The thermal decomposition vapor-phase grown carbon fibers are carbon fibers obtained by (1) a method of thermally decomposing acrylic polymer fibers, (2) a method of spinning and then thermally decomposing pitches, or (3) a catalytic vapor-phase growth (catalytic CVD) method in which hydrocarbon is thermally decomposed in a vapor phase using nanoparticles of, e.g., iron as a catalyst.

Examples of the non-graphitizable carbon may include a calcined product of phenolic resin, polyacrylonitrile-based carbon fibers, quasi-isotropic carbon, a calcined product of furfuryl alcohol resin (PFA), and hard carbon.

The graphite material is a graphite material that is obtained by heat-treating graphitizable carbon at 2,000° C. or higher and has a high crystallinity that is close to the crystallinity of graphite. There are no particular limitations to the upper limit of the heat treatment temperature. The upper limit thereof may be, e.g., 5000° C. or lower.

Examples of the graphite materials may include natural graphite and artificial graphite. Typical examples of the artificial graphite may include artificial graphite obtained by heat treatment at 2,800° C. or higher, graphitized MCMB obtained by heat treatment of MCMB at 2,000° C. or higher, and graphitized mesophase pitch carbon fibers obtained by heat treatment of mesophase pitch carbon fibers at 2,000° C. or higher.

Of the aforementioned carbon active materials, graphite materials are preferable. When the graphite material is used, the resistance of the secondary battery can be reduced, whereby a secondary battery with excellent input-output property can be produced.

As the negative electrode active material, one species thereof may be solely used, or two or more species thereof may be used in combination at any ratio.

A preferable embodiment of the negative electrode active material may be a combination of a metal active material and a carbon active material. In this case, a particularly preferable embodiment may be a combination of SiOC, Sn, or $SiO_x$ (0<x≤2) as the metal active material and a graphite material as the carbon active material. In this combination, the ratio of the metal active material relative to the graphite material may be metal active material/graphite material weight ratio=5/95 to 50/50. When the combination has this weight ratio, a balance between a high capacity and the cycle property can be achieved.

It is preferable that the negative electrode active material is granulated in a form of particles. When the particles have a spherical shape, an electrode having a higher density can be formed in the process of forming the electrode.

When the negative electrode active material is in a particle form, the volume average particle diameter thereof is appropriately selected in view of the balance with other constituent elements of the secondary battery. The volume average particle diameter is usually 0.1 μm or larger, preferably 1 μm or larger, and more preferably 5 μm or larger, and is usually 100 μm or smaller, preferably 50 μm or smaller, and more preferably 20 μm or smaller.

From the viewpoint of improvement in battery properties such as initial efficiency, load property, and cycle property, the 50% cumulative volumetric diameter of the particles of the negative electrode active material is usually 1 μm or larger and preferably 15 μm or larger, and is usually 50 μm or smaller and preferably 30 μm or smaller. The 50% cumulative volumetric diameter may be calculated as a particle diameter at which the accumulated volume calculated in a particle diameter distribution measured by the laser diffraction method from a small particle diameter side is 50%.

The tap density of the negative electrode active material is not particularly limited. A material having tap density of 0.6 $g/cm^3$ or more may be suitably used.

From the viewpoint of improvement in power density, the specific surface area of the negative electrode active material is usually 2 $m^2/g$ or larger, preferably 3 $m^2/g$ or larger, and more preferably 5 $m^2/g$ or larger, and is usually 20 $m^2/g$ or smaller, preferably 15 $m^2/g$ or smaller, and more preferably 10 $m^2/g$ or smaller. The specific surface area of the negative electrode active material may be measured by, e.g., a BET method.

[2-2. Ratio of Negative Electrode Active Material and Binder Composition]

There are no particular limitations to the containing ratio of the negative electrode active material and the binder composition in the negative electrode according to the present invention. Based on 100 parts by weight of the negative electrode active material, the amount of the binder composition is usually 0.1 parts by weight or more and preferably 0.5 parts by weight or more, and is usually 10 parts by weight or less and preferably 5.0 parts by weight or less. When the containing ratio of the binder composition relative to that of the negative electrode active substance is set within the aforementioned range, the aforementioned effects according to the present invention can be stably exerted.

[2-3. Components that May be Contained in Negative Electrode Active Material Layer]

The negative electrode active material layer of the negative electrode according to the present invention may contain a component other than the aforementioned binder composition and negative electrode active material. Examples of the component may include a viscosity modifier, a electroconducting agent, a reinforcement material, a leveling agent, and an electrolyte liquid additive. One species of these component may be solely used, or two or more species thereof may be used in combination at any ratio.

The viscosity modifier is a component that is used for controlling the viscosity of the slurry composition for a negative electrode according to the present invention so as to improve the dispersibility and application capability of the slurry composition for a negative electrode. Usually, the viscosity modifier contained in the slurry composition for a negative electrode remains in the negative electrode active material layer.

As the viscosity modifier, a water-soluble polysaccharide is preferably used. Examples of the polysaccharide may include a natural polymer compounds and a cellulose-based semisynthetic polymer compound. As the viscosity modifier, one species thereof may be solely used, or two or more species thereof may be used in combination at any ratio.

Examples of the natural polymer compound may include polysaccharides and proteins that are derived from a plant or an animal. In some cases, examples thereof may also include natural polymer compounds that have been subjected to fermentation by microorganism and natural polymers that have been subjected to heat treatment. These natural polymer compounds may be classified into a plant-derived natural polymer compound, an animal-derived natural polymer compound, a microorganism-derived polymer compound, etc.

Examples of the plant-derived natural polymer compound may include gum arabic, gum tragacanth, galactan, guar gum, carob gum, karaya gum, carrageenan, pectin, agar, quince seed (marmelo), algae colloid (brown algae extract), starch (derived from rice, corn, potato, wheat, etc.), and glycyrrhizin. Examples of the animal-derived natural polymer compound may include collagen, casein, albumin, and gelatin. Examples of the microorganism-derived natural polymer compound may include xanthan gum, dextran, succinoglucan, and pullulan.

The cellulose-based semisynthetic polymer compounds may be classified into nonioic, anionic, and cationic cellulose-based semisynthetic polymer compounds.

Examples of the nonioic cellulose-based semisynthetic polymer compound may include an alkyl cellulose such as methyl cellulose, methyl ethyl cellulose, ethyl cellulose, and microcrystalline cellulose; and a hydroxyalkyl cellulose such as hydroxyethyl cellulose, hydroxybutyl methyl cellulose, hydroxypropyl cellulose, hydroxypropyl methyl cellulose, hydroxyethyl methyl cellulose, hydroxypropyl methyl cellulose stearoxy ether, carboxylmethyl hydroxyethyl cellulose, alkyl hydroxyethyl cellulose, and nonoxynyl hydroxyethyl cellulose.

Examples of the anionic cellulose-based semisynthetic polymer compound may include alkyl cellulose obtained by substitution of the aforementioned nonioic cellulose-based semisynthetic polymer compounds with a variety of derivation groups, and a sodium salt and an ammonium salt thereof. Specific examples thereof may include sodium cellulose sulfate, methyl cellulose, methyl ethyl cellulose, ethyl cellulose, carboxymethyl cellulose (CMC), and salts thereof.

Examples of the cationic cellulose-based semisynthetic polymer compound may include low-nitrogen hydroxyethyl cellulose dimethyl diallylammonium chloride (polyquaternium-4), O-[2-hydroxy-3-(trimethylammonio)propyl]hydroxyethyl cellulose chloride (polyquaternium-10), and O-[2-hydroxy-3-(lauryldimethylammonio)propyl]hydroxyethyl cellulose chloride (polyquaternium-24).

Of these, the cellulose-based semisynthetic polymer compound, and a sodium salt and an ammonium salt thereof are preferable since they may have a cationic property, an anionic property, or amphoteric property. In particular, the anionic cellulose-based semisynthetic polymer compound is particularly preferable from the viewpoint of dispersibility of the negative electrode active material.

The etherification degree of the cellulose-based semisynthetic polymer compound is preferably 0.5 or more, and more preferably 0.6 or more, and preferably 1.0 or less, and more preferably 0.8 or less. The etherification degree refers to the degree of substitution of (three) hydroxyl group(s) to form a substitution such as a carboxymethyl group per anhydrous glucose unit in cellulose. Theoretically, the etherification degree may take a value of 0 to 3. When the etherification degree falls within the aforementioned range, the cellulose-based semisynthetic polymer compound exhibits an excellent dispersibility by being adsorbed on the surface of the negative electrode active material and being compatible with water. Therefore, it is possible to finely disperse the negative electrode active material at the primary particle level.

When a macromolecule compound (including a polymer) is used as a viscosity modifier, the average polymerization degree of the viscosity modifier that is calculated from the limiting viscosity measured with an Ubbelohde viscometer is preferably 500 or more, and more preferably 1,000 or more, and preferably 2,500 or less, more preferably 2,000 or less, and particularly preferably 1,500 or less. The average polymerization degree of the viscosity modifier may affect the flowability of the slurry composition for a negative electrode of the present invention, the film uniformity of the negative electrode active material layer, and processes in the steps. When the average polymerization degree falls within the aforementioned range, stability of the slurry composition for a negative electrode of the present invention over the lapse of time can be improved, and application free of generation of aggregates and uneven thickness can be achieved.

The amount of the viscosity modifier is preferably 0 parts by weight or more and preferably 0.5 parts by weight or less relative to 100 parts by weight of the negative electrode active material. When the amount of the viscosity modifier falls within the aforementioned range, the viscosity of the slurry composition for a negative electrode according to the present invention can be adjusted to be within a preferable range suitable for handling.

The electroconducting agent is a component that improves electrical contact between the negative electrode active material segments. When the negative electrode active material layer contains the electroconducting agent, discharge rate property of the secondary battery of the present invention can be improved.

Examples of the electroconducting agent for use may include electroconductive carbon such as acetylene black, Ketjen black, carbon black, graphite, vapor-phase grown carbon fibers, and carbon nanotubes. As the electroconducting agent, one species thereof may be solely used, or two or more species thereof may be used in combination at any ratio.

The amount of the electroconducting agent is preferably 1 to 20 parts by weight, and more preferably 1 to 10 parts by weight, relative to 100 parts by weight of the negative electrode active material.

Examples of the reinforcement material for use may include a variety of organic and inorganic fillers in a spherical shape, plate shape, rod shape or fibrous shape. When the reinforcement material is used, a tough and flexible negative electrode can be obtained, whereby a secondary battery with excellent long-term cycle property can be realized.

The amount of the reinforcement material is usually 0.01 parts by weight or more, and preferably 1 part by weight or more, and is usually 20 parts by weight or less, and preferably 10 parts by weight or less, relative to 100 parts by weight of the negative electrode active material. When the amount of the reinforcing agent is set within the aforementioned range, the secondary battery can exhibit a high capacity and high load property.

Examples of the leveling agent may include surfactants such as an alkyl-based surfactant, a silicone-based surfactant, a fluorine-based surfactant, and a metal-based surfactant. Use of the leveling agent can prevent cissing that otherwise occurs during application of the slurry for a negative electrode, and can also improve the smoothness of a negative electrode.

The amount of the leveling agent is preferably 0.01 parts by weight to 10 parts by weight relative to 100 parts by weight of the negative electrode active material. When the amount of the leveling agent is set within the aforementioned range, the negative electrode can be produced with high smoothness at high productivity, and excellent battery property can be obtained. When the surfactant is contained, dispersibility of the negative electrode active material etc. in the slurry composition for a negative electrode can be improved. Further, smoothness of the negative electrode thus obtained can be improved.

Examples of the electrolyte liquid additive may include vinylene carbonate. Use of the electrolytic liquid additive can, e.g., suppress the decomposition of the electrolytic liquid.

The amount of the electrolytic liquid additive is preferably 0.01 parts by weight to 10 parts by weight relative to 100 parts by weight of the negative electrode active material. When the amount of the electrolytic liquid additive is set within the aforementioned range, a secondary battery having excellent cycle property and high-temperature property can be realized.

The negative electrode active material layer may also contain nano-fine particles of, e.g., fumed silica and fumed alumina. When the nano-fine particles are contained, the thixotropy of the slurry composition for a negative electrode can be controlled. Therefore, the leveling property of the negative electrode thus obtained can be improved.

The amount of the nano-fine particles is preferably 0.01 parts by weight to 10 parts by weight relative to 100 parts by weight of the negative electrode active material. When the amount of the nano-fine particles is set within the aforementioned range, the stability and productivity of the slurry composition for a negative electrode can be improved, and high battery property can be achieved.

[2-4. Current Collector and Negative Electrode Active Material Layer]

The negative electrode according to the present invention includes the negative electrode active material layer containing the aforementioned negative electrode active material, the binder composition, and other components that may be used if necessary. This negative electrode active material layer is usually provided on the surface of a current collector. In this case, the negative electrode active material layer may be provided on at least one of the surfaces of the current collector, but is preferably provided on both the surfaces.

There are no particular limitations to the current collector for a negative electrode as long as the current collector is electrically conductive and is made of an electrochemically durable material. However, a metal material is preferable as the current collector can have heat resistance. Examples of the materials of the current collector for a negative electrode may include iron, copper, aluminum, nickel, stainless steel, titanium, tantalum, gold, and platinum. Of these, as the current collector for the negative electrode of a secondary battery, copper is particularly preferable. One species of the aforementioned materials may be solely used, or two or more species thereof may be used in combination at any ratio.

There are no particular limitations to the shape of the current collector, but a sheet-shaped current collector with a thickness of about 0.001 mm to about 0.5 mm is preferable.

It is preferable that the current collector is roughened in advance of use for enhancing the adhesion strength of the current collector with the electrode active material. Examples of the roughening method may include a mechanical polishing method, an electrolytic polishing method, and a chemical polishing method. In the mechanical polishing method, e.g., polishing paper to which polishing agent particles are fixed, a grind stone, an emery wheel, and a wire brush having steel wire are usually used. Further, in order to improve the adhesion strength and electroconductivity of the negative electrode active material layer, an intermediate layer may be formed on the surface of the current collector.

The negative electrode active material layer is usually provided on the surface of the current collector.

The thickness of the negative electrode active material layer is usually 5 μm or larger and preferably 30 μm or larger, and is usually 300 μm or smaller and preferably 250 μm or smaller. When the thickness of the negative electrode active material layer falls within the aforementioned range, the load property and the cycle property can be improved.

The containing ratio of the negative electrode active material in the negative electrode active material layer is preferably 85% by weight or more and more preferably 88% by weight or more, and is preferably 99% by weight or less and more preferably 97% by weight or less. When the containing ratio of the negative electrode active material is set within the aforementioned range, a negative electrode that enables high capacity as well as flexibility and binding property can be realized.

The amount of water in the negative electrode active material layer is preferably 1000 ppm or lower and more preferably 500 ppm or lower. When the amount of water in the negative electrode active material layer falls within the aforementioned range, the negative electrode can have excellent durability. The amount of water may be measured by any known method such as a Karl Fischer's method.

Such low amount of water may be achieved by appropriately adjusting the composition of the units constituting the water-soluble polymer. In particular, the amount of water can be reduced by setting the amount of the fluorine-containing (meth)acrylic acid ester monomer unit to 0.5 to 20% by weight and preferably 1 to 10% by weight.

[3. Method for Producing Negative Electrode for Secondary Battery and Slurry Composition for Negative Electrode]

There are no particular limitations to the method for producing the negative electrode for a secondary battery of the present invention (which may be appropriately referred to hereinbelow as the "method for producing a negative electrode according to the present invention"). Examples of the production method may include: (I) a method in which the slurry composition for a negative electrode according to the present invention is prepared, and the slurry composition for a negative electrode is then applied onto the surface of a current collector and dried, to form a negative electrode active material on the surface of the current collector (coating method); and (II) a method in which composite particles is prepared from the slurry composition for a negative electrode according to the present invention, then the composite particles are supplied onto a current collector to form a sheet, and, if necessary, roll press of the particles is performed to form a negative electrode active material layer (dry forming method). Of these, the dry forming method (II) is preferable since the obtained secondary battery can have a high capacity and a reduced internal resistance.

The slurry composition for a negative electrode according to the present invention is a slurry-form composition containing the negative electrode active material, the binder, the water-soluble polymer, and water. If necessary, the slurry composition for a negative electrode according to the present invention may contain an optional component other than the negative electrode active material, the binder, the water-soluble polymer, and water. The amounts of the negative electrode active material, the binder, and the water-soluble polymer as well as the components that are optionally contained are usually the same as those of the respective components contained in the negative electrode active material layer. In the slurry composition for a negative electrode according to the present invention, a part of the water-soluble polymer is dissolved in water, but another part of the water-soluble polymer is adsorbed to the surface of the negative electrode active material. The negative electrode active material is thereby covered with a stable layer of the water-soluble polymer, and the dispersibility of the negative electrode active material in the solvent is improved. Therefore the slurry composition for a negative electrode according to the present invention exerts favorable application capability when it is applied onto the current collector.

In the slurry composition for a negative electrode, water acts as a solvent or dispersion medium that allows the negative electrode active material to be dispersed therein, the binder to be dispersed in a particulate form, and the water-soluble polymer to be dissolved therein. In this case, a liquid other than water may be used as the solvent in combination with water. It is preferable to use a liquid that dissolves the binder and the water-soluble polymer in combination because thereby the binder and the water-soluble polymer are adsorbed to the surface of the negative electrode active material, and its dispersion is stabilized.

It is preferable to select the type of the liquid to be combined with water from the viewpoint of drying rate and environmental considerations. Preferable example of the liquids include: cyclic aliphatic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; acylonitriles such as acetonitrile and propionitrile; ethers such as tetrahydrofuran and ethylene glycol diethyl ether; alcohols such as methanol, ethanol, isopropanol, ethylene glycol, and ethylene glycol monomethyl ether; and amides such as N-methylpyrrolidone and N,N-dimethylformamide. Of these, N-methylpyrrolidone (NMP) is preferable. One species of them may be solely used, or two or more species thereof may be used in combination at any ratio.

It is preferable that the amounts of water and the aforementioned liquid are adjusted such that the viscosity of the slurry composition for a negative electrode of the present invention is set to a viscosity suitable for application. Specifically, the their amounts are adjusted such that the concentration of the solid content of the slurry composition for a negative electrode according to the present invention is preferably 30% by weight or more and more preferably 40% by weight or more, and is preferably 90% by weight or less and more preferably 80% by weight or less.

The slurry composition for a negative electrode according to the present invention may be produced by mixing the aforementioned negative electrode active material, the binder composition, water, and the optionally used components. There are no particular limitations to the mixing method, but examples of the mixing methods may include those using a stirring type mixer, a shaking type mixer, or a rotation type mixer. Other mixing methods may include those using dispersion kneaders such as a homogenizer, a ball mill, a sand mill, a roll mill, a planetary mixer, and a planetary kneader.

In (I) coating method, there are no particular limitations to the method for applying the slurry composition for a negative electrode according to the present invention onto the surface of the current collector. Examples of the application methods may include a doctor blade method, a dipping method, a reverse roll method, a direct roll method, a gravure method, an extrusion method, and a brush coating method.

Examples of the drying methods may include drying with warm air, hot air, and low-humidity air, vacuum drying, and drying methods employing (far)infrared ray radiation or electron beam. The drying time is usually 5 minutes to 30 minutes, and the drying temperature is usually 40° C. to 180° C.

The composite particles used in the dry forming method (II) are prepared from the slurry composition for a negative electrode according to the present invention.

Therefore, the composite particle is prepared as a particle wherein the binder composition, the negative electrode active material, etc. that are the constituents of the slurry composition are integrated. Specifically, the negative electrode active material and particulate binder constituting the slurry composition are not present as separate or independent particles, but, two or more constituent components of the negative electrode active material, the particulate binder and the water-soluble polymer form one particle. Specifically, it is preferable that a plurality of individual particles composed of the aforementioned two or more components are bound to form secondary particles and a plurality of (preferably several to several tens of) the particles of the negative electrode active material are bound by the particulate binder to form a particle. When the negative electrode active material layer is formed of the composite particles, the peel strength of the obtained negative electrode for a secondary battery can be increased, and the internal resistance thereof can be reduced.

The composite particles preferably used in the dry forming method are produced by granulating the slurry composition for a negative electrode containing the binder composition according to the present invention, the negative electrode active material, and, if necessary, an electroconducting agent, etc.

There are no particular limitations to the method for granulating the composite particles. The composite particles may be produced by a publicly known granulation method such as a spray drying granulation method, a dynamic layer granulation method, a compression-type granulation method, a stirring-type granulation method, an extrusion granulation method, a crushing-type granulation method, a fluidized bed granulation method, a fluidized bed multifunctional granulation method, a pulse combustion drying method, and a melt granulation method. Of these, the spray drying granulation method is preferable since thereby the composite particles in which the binder composition and the electroconducting agent are locally distributed near the surface can be readily obtained. When the composite particles obtained by the spray drying granulation method are used, the negative electrode for a secondary battery according to the present invention can be produced at high productivity. Further, internal resistance of the negative electrode can be reduced.

In the spray drying granulation method, the slurry composition for a negative electrode of a secondary battery according to the present invention is spray-dried for granulation to obtain the composite particles. Spray drying is performed by spraying the slurry composition into hot air to dry the composition. Examples of devices that are used for spraying the slurry composition may include atomizers. There are two types of atomizers including a rotating disk system and a pressurization system. In the rotating disk system, the slurry composition is introduced to approximately the center of a high-speed rotating disk. The slurry composition is driven out of the disk by the centrifugal force of the disk, and at that time the slurry composition is atomized. The rotating speed of the disk, which depends on the size thereof, is usually 5,000 to 40,000 rpm and preferably 15,000 to 40,000 rpm. The slower the rotating speed of the disk is, the larger the size of the sprayed liquid droplet becomes and the larger the weight average particle diameter of the obtained composite particle becomes. The atomizers of the rotating disk system may be classified into a pin type and a vane type, and a pin-type atomizer is preferable. A pin-type atomizer is one type of centrifugal spraying device using a spraying disk. The spraying disk is made of upper and lower mounting circular plates and a plurality of spraying rollers removably attached between the upper and lower mounting circular plates. The spraying rollers are mounted approximately along a circle that is concentric with the peripheries of the upper and lower mounting circular plates. The slurry composition is introduced through the center of the spraying disk, and adheres to the spraying rollers by the centrifugal force. The slurry composition then moves on the roller surfaces toward outside, and finally leaves the roller surfaces to be sprayed. In the pressurization system, the slurry composition is pressurized, and atomized through the nozzle to dry the composition.

The temperature of the sprayed slurry composition is usually room temperature, but the sprayed slurry composition may be heated to a temperature equal to or higher than room temperature. The temperature of hot air at the time of spray drying is usually 80 to 250° C. and preferably 100 to 200° C.

In spray drying, there are no particular limitations to the method of blowing the hot air. Examples thereof may include a system in which spray travels in parallel with hot air in a lateral direction; a system in which the slurry composition is sprayed at the top of a drying tower and travels downward together with hot air; a system in which a sprayed droplet and hot air are brought into countercurrent contact with each other; and a system in which a sprayed droplet initially flows in parallel with hot air, and then falls downward due to gravity so as to be brought into countercurrent contact.

It is preferable that the composite particles to be preferably used in the dry forming method have a substantially spherical shape. That is, when the sphericity (%) is defined as the value of $(1-((Ll-Ls)/La)\times 100$ wherein Ls is the short axis of the composite particle, Ll is the long axis thereof, and $La=(Ls+Ll)/2$, the sphericity of the composite particle is preferably 80% or more, and more preferably 90% or more. The short axis Ls and the long axis Ll are values measured from a photographic image of a transmission type electron microscopy.

The volume average particle diameter of the composite particles to be preferably used in the dry forming method is usually 10 to 100 μm, preferably 20 to 80 μm, and more preferably 30 to 60 μm. The volume average particle diameter may be measured using a laser diffraction particle size distribution analyzer.

In the dry forming method, there are no limitations to a feeder used in the step of supplying the composite particles on the current collector. It is preferable that a feeder therefor is a quantitative feeder that is capable of quantitatively supplying the composite particles. In this context, "capable of quantitatively supplying" is defined as the CV value $(=\sigma m/m\times 100)$ of 4 or lower, wherein the value is obtained by continuously supplying the composite particles with the feeder and the supplied amount is measured multiple times at a fixed interval, to obtain the average value of the measurements m and its standard deviation σm. The quantitative feeder that may be preferably used in the dry forming method can have the CV value to equal to or lower than 2. Specific examples of the quantitative feeders may include: gravity feeders such as a table feeder and a rotary feeder; and mechanical power feeders such as a screw feeder and a belt feeder. Of these, a rotary feeder is preferable.

Subsequently, a pressure is applied onto the current collector and the supplied composite particles using a pair of rolls, to form a negative electrode active material layer on the current collector. In this step, the composite particles are optionally heated and then processed with the pair of rolls to form a sheet-shaped negative electrode active material layer. The temperature of the supplied composite particles is preferably 40 to 160° C. and more preferably 70 to 140° C. When the composite particles that are heated in this temperature range are used, the composite particles do not slip on the surface of the press rolls and are continuously and uniformly supplied to the press rolls. It is thereby possible to obtain a negative electrode active material layer with uniform film thickness and small deviation in the electrode density.

The temperature during the forming is usually 0 to 200° C., preferably higher than the melting point or glass transition temperature of the particulate binder used in the present invention, and more preferably higher than the melting point or glass transition temperature thereof by 20° C. or more. When the rolls are used, the forming rate is usually greater than 0.1 m/min. and preferably 35 to 70 m/min. The press linear pressure between press rolls is usually 0.2 to 30 kN/cm and preferably 0.5 to 10 kN/cm.

In the aforementioned production method, there are no particular limitations to the manner of arrangement of the pair of rolls, but it is preferable that the pair of rolls are arranged in approximately horizontal or approximately vertical manner. When the pair of rolls are arranged in approximately horizontal manner, the current collector is continuously supplied to the space between the pair of rolls, and the composite particles are supplied to at least one of the rolls, whereby the composite particles are supplied to the space between the current collector and the rolls. Then as a result of applying pressure, the negative electrode active material layer can be formed. When the pair of rolls are arranged in approximately vertical manner, the current collector is conveyed in the horizontal direction, and the composite particles are supplied on the current collector. After the supplied composite particles are optionally leveled by a blade or the like, the current collector is supplied to the space between the pair of rolls, Then as a result of applying pressure, the negative electrode active material layer can be formed.

In the coating method (I), after the slurry composition for a negative electrode is applied onto the surface of the current collector and dried, it is preferable that the negative electrode active material layer is optionally subjected to pressure treatment using, e.g., a metal die press or a roll press. By performing pressure treatment, the void ratio of the negative electrode active material layer can be reduced. The void ratio is preferably 5% or more and more preferably 7% or more, and is preferably 30% or less and more preferably 20% or less. When the void ratio is set to a value equal to or larger than the aforementioned lower limit of the aforementioned range, a high volume capacity can be readily achieved, and the negative electrode active material layer can have low tendency to be peeled off the current collector. When the void ratio is set to a value equal to or lower than the aforementioned upper limit, high charging and discharging efficiency can be achieved.

When the negative electrode active material layer contains a curable polymer, it is preferable to cure the polymer after formation of the negative electrode active material layer.

[4. Secondary Battery]

The secondary battery according to the present invention includes the negative electrode according to the present invention. Usually, the secondary battery according to the present invention includes a positive electrode, a negative electrode, an electrolyte liquid, and a separator, and the negative electrode is the negative electrode according to the present invention.

As the secondary battery according to the present invention includes the negative electrode according to the present invention, swelling of the negative electrode upon charging and discharging can be suppressed, and reduction in capacity after storage in a high-temperature environment is less likely to occur. In addition, usually, the high-temperature cycle property and low-temperature output property according to the secondary battery of the present invention can be improved, and the adhesion property of the negative electrode active material layer to the current collector can also be improved.

[4-1. Positive Electrode]

The positive electrode usually includes a current collector and a positive electrode active material layer that is formed on the surface of the current collector. The positive electrode active material layer contains a positive electrode active material and a binder for the positive electrode.

There are no particular limitations to the material of the current collector of the positive electrode as long as it is an electrically conductive and electrochemically durable material. As the current collector of the positive electrode, current collectors used for the negative electrode of the present invention may be used. Of these, aluminum is particularly preferable.

When the secondary battery according to the present invention is, e.g., a lithium ion secondary battery, a material that can be intercalated and deintercalated with lithium ions is used as the positive electrode active material. Such positive electrode active materials are roughly classified into materials formed of an inorganic compound and materials formed of an organic compound.

Examples of the positive electrode active material formed of an inorganic compound may include transition metal oxides, transition metal sulfides, and lithium-containing complex metal oxides of lithium and transition metal.

Examples of the aforementioned transition metals may include Ti, V, Cr, Mn, Fe, Co, Ni, Cu, and Mo.

Examples of the transition metal oxides may include: MnO, $MnO_2$, $V_2O_5$, $V_6O_{13}$, $TiO_2$ and $Cu_2V_2O_3$; and amorphous $V_2O$—$P_2O_5$, $MoO_3$, $V_2O_5$, and $V_6O_{13}$. Of these, MnO, $V_2O_5$, $V_6O_{13}$, and $TiO_2$ are preferable in terms of cycle stability and capacity.

Examples of the transition metal sulfides may include: $TiS_2$ and $TiS_3$; and amorphous $MoS_2$ and FeS.

Examples of the lithium-containing complex metal oxides may include a lithium-containing complex metal oxide having a layered structure, a lithium-containing complex metal oxide having a spinel structure, and a lithium-containing complex metal oxide having an olivine-type structure.

Examples of the lithium-containing complex metal oxides having a layered structure may include a lithium-containing cobalt oxide ($LiCoO_2$), a lithium-containing nickel oxide ($LiNiO_2$), a Co—Ni—Mn lithium complex oxide, a Ni—Mn—Al lithium complex oxide, and a Ni—Co—Al lithium complex oxide.

Examples of the lithium-containing complex metal oxides having a spinel structure may include lithium manganate ($LiMn_2O_4$) and $Li[Mn_{3/2}M_{1/2}]O_4$ obtained by substituting part of Mn with another transition metal (wherein M is Cr, Fe, Co, Ni, Cu, etc.).

Examples of the lithium-containing complex metal oxides having an olivine-type structure may include an olivine-type lithium phosphate compound represented by $Li_xMPO_4$ (wherein M represents at least one selected from the group consisting of Mn, Fe, Co, Ni, Cu, Mg, Zn, V, Ca, Sr, Ba, Ti, Al, Si, B, and Mo, and X represents a number satisfying $0 \leq X \leq 2$).

Examples of the positive electrode active material formed of an organic compound may include electroconductive polymer compounds such as polyacetylene and poly-p-phenylene.

Further, a positive electrode active material formed of a composite material that is a combination of an inorganic compound and an organic compound may also be used. For example, an iron-containing oxide may be subjected to reduction-firing in the presence of a carbon source material to produce a composite material coated with a carbon material, and this composite material may be used as the positive electrode active material. An iron-containing oxide tends to have poor electroconductivity. However, it may be used as a high performance positive electrode active material when it turns into such a composite material.

Further, those obtained by partial element substitution of the aforementioned compound may also be used as a positive electrode active material. In addition, a mixture of the inorganic compound and the organic compound may also be used as the positive electrode active material.

As the positive electrode active material, one species thereof may be solely used, or two or more species thereof may be used in combination at any ratio.

The volume average particle diameter of the particles of the positive electrode active material is usually 1 gm or larger and preferably 2 μm or larger, and usually 50 μm or smaller and preferably 30 μm or smaller. When the volume average particle diameter of the particles of the positive electrode active material falls within the aforementioned range, the amount of the binder used for preparing the positive electrode active material layer can be reduced, and a reduction in capacity of the secondary battery can be suppressed. For forming the positive electrode active material layer, a positive electrode slurry composition containing the positive electrode active material and the binder is usually prepared. The viscosity of the slurry composition for a positive electrode can be easily adjusted to a proper viscosity for facilitating application, and a uniform positive electrode can thereby be obtained.

The containing ratio of the positive electrode active material in the positive electrode active material layer is preferably 90 wt % or more and more preferably 95 wt % or more, and preferably 99.9 wt % or less and more preferably 99 wt % or less. When the content of the positive electrode active material is set within the aforementioned range, the secondary battery can have a high capacity, and the flexibility of the positive electrode and the bonding property of the positive electrode active material layer with the current collector can be enhanced.

Examples of the binder for the positive electrode may include resins such as polyethylene, polytetrafluoroethylene (PTFE), polyvinylidene fluoride (PVDF), a tetrafluoroethylene-hexafluoropropylene copolymer (FEP), a polyacrylic acid derivative, and a polyacrylonitrile derivative; or soft polymers such as an acryl soft polymer, a diene soft polymer, an olefin soft polymer, and a vinyl soft polymer. As the binder, one species thereof may be solely used, or two or more species thereof may be used in combination at any ratio.

If necessary, the positive electrode active material layer may contain a component other than the positive electrode active material and the binder. Examples thereof may include a viscosity modifier, an electroconducting agent, a reinforcing material, a leveling agent, and an electrolyte additive. One species of these components may be solely used, or two or more species thereof may be used in combination at any ratio.

The thickness of the positive electrode active material layer is usually 5 μm or more and preferably 10 μm or more, and is usually 300 μm or less and preferably 250 μm or less. When the thickness of the positive electrode active material layer falls within the aforementioned range, high properties of both load property and energy density can be realized.

The positive electrode may be produced by, e.g., the same procedure as the aforementioned procedure for producing the negative electrode.

[4-2. Electrolyte Liquid]

As the electrolyte liquid, e.g., those produced by dissolving a lithium salt as a supporting electrolyte in a non-aqueous solvent may be used. Examples of the lithium salts may include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. In particular, $LiPF_6$, $LiClO_4$, and $CF_3SO_3Li$, which are highly soluble in a solvent and shows a high dissociation degree is suitably used. One species of them may be solely used, or two or more species thereof may be used in combination at any ratio.

The amount of the supporting electrolyte is usually 1 wt % or more and preferably 5 wt % or more, and usually 30 wt % or less and preferably 20 wt % or less, relative to the electrolytic liquid. When the amount of the supporting electrolyte is too small or too large, the ion conductivity may possibly decrease, and the charging property and discharging property of the secondary battery may possibly decreas.

There are no particular limitations to the solvent for the electrolyte liquid as long as the supporting electrolyte can be dissolved therein. Examples of the solvents may include: alkyl carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethylsulfoxide. Particularly, dimethyl carbonate, ethylene carbonate, propylene carbonate, diethyl carbonate, and methyl ethyl carbonate are preferable because of its tendency to facilitate high ion conductivity and its wide range of usable temperature. As the solvent, one species thereof may be solely used, or two or more species thereof may be used in combination at any ratio.

If necessary, the electrolytic liquid may further contain an additive. As the additive, a carbonate compound such as vinylene carbonate (VC) is preferable. As the additive, one species thereof may be solely used, or two or more species thereof may be used in combination at any ratio.

Examples of electrolytic liquid other than the aforementioned electrolytic liquids may include: a gelled polymeric electrolyte obtained by impregnating a polymeric electrolyte such as polyethylene oxide and polyacrylonitrile with an electrolytic liquid; and an inorganic solid electrolyte such as lithium sulfide, LiI, and $Li_3N$.

[4-3. Separator]

As the separator, a porous substrate having pore portions is usually used. Examples of the separator may include (a) a porous separator having pore portions, (b) a porous separator having a polymer coating layer formed on its one or both surfaces, and (c) a porous separator having formed thereon a resin coating layer including inorganic ceramic powders. Examples thereof may include: polypropylene-based, polyethylene-based, polyolefin-based, and aramid-based porous separators; polymer films for a solid polymer electrolyte or a gel polymer electrolyte that are made of polyvinylidene fluoride, polyethylene oxide, polyacrylonitrile, or a polyvinylidene fluoride hexafluoropropylene copolymer; a separator coated with a gelled polymer coating layer; and a separator coated with a porous membrane layer formed of an inorganic filler and a dispersing agent for the inorganic filler.

[4-4. Method for Producing Secondary Battery]

There are no particular limitations to the method for producing the secondary battery according to the present invention. For example, the negative electrode and positive electrode are stacked with the separator interposed therebetween, and the resulting stack is then wound or folded in conformity with the shape of the battery and then put in a battery container. Subsequently, the electrolytic liquid is poured into the battery container, and the container is sealed, to produce a battery. If necessary, expanded metal; an over-current protective element such as a fuse and a PTC element; and a lead plate may be put into the container to prevent an increase in the pressure inside the battery, and to prevent overcharging and overdischarging. The shape of the battery may be any of a laminated cell shape, a coin shape, a button shape, a sheet shape, a cylindrical shape, a rectangular shape, and a flat shape.

EXAMPLES

The present invention will be specifically described referring to Examples. However, the present invention is not limited to the following Examples, and may be arbitrary modified and embodied without departing from the scope of the claims and equivalents thereto. In the following description of Examples, "%" and "part" representing an amount are based on weight unless otherwise specified. The following operations were performed under the conditions of room temperature and normal pressure unless otherwise specified.

[Evaluation Method]

1. Adhesion Strength

The negative electrode produced in Examples and Comparative Examples was cut into a rectangular shape with a length of 100 mm and a width of 10 mm, to prepare a test piece. The surface of the negative electrode active material layer of the test piece was affixed to cellophane tape with the surface of the negative electrode active material layer facing downward. As the cellophane tape, the one defined in JIS Z1522 was used. The cellophane tape was secured to a test table in advance. Then one end of the current collector was pulled vertically upward at a pulling speed of 50 mm/min to peel it, and stress at this time was measured. This measurement was repeated three times, and the average of the measurement results was calculated. This average value was taken as the peel strength. Larger peel strength is indicative of strong binding strength of the negative electrode active material layer to the current collector, i.e., great adhesion strength.

2. Application Capability

The slurry composition for a negative electrode produced in the Examples and Comparative Examples was applied onto a 20 μm-thick copper foil as a current collector so that the film thickness after drying was about 150 μm, and then dried. This drying was performed by conveying the copper foil through an oven at 60° C. at a speed of 0.5 m/min. for 2 minutes. Then heat treatment was performed at 120° C. for 2 minutes to obtain a negative electrode. The negative electrode thus obtained was cut into a piece with a size of 10×10 cm, and the number of pinholes having a diameter of 0.1 mm or larger was counted by visual observation. Small number of pinholes is indicative of better application capability.

3. High-temperature Storage Property

The laminate cell-type lithium ion secondary battery produced in Examples and Comparative Examples was left to stand still in the environment of 25° C. for 24 hours, and then a charging-discharging operation was performed wherein charging was performed by the constant current method at 0.1 C to 4.2 V and then discharging was performed to 3.0 V, to measure the initial capacity $C_0$. Then the battery was charged to 4.2 V in the environment of 25° C. and stored for seven days in the environment of 60° C. Thereafter, a charging-discharging operation was performed in the environment of 25° C. wherein charging was performed by the constant current method at 0.1 C to 4.2 V, and discharging was performed to 3.0 V, to measure the capacity $C_1$ after the high-temperature storage. The high temperature storage property was evaluated based on the capacity change rate $\Delta C_s$ represented by $\Delta C_s = C_1/C_0 \times 100(\%)$. High value of the capacity change rate $\Delta C_s$ is indicative of high high-temperature storage property.

4. High-temperature Cycle Property

The laminate cell-type lithium ion secondary battery produced in Examples and Comparative Examples was left to stand still in the environment of 25° C. for 24 hours, and then a charging-discharging operation was performed wherein charging was performed by the constant current method at 0.1 C to 4.2 V and then discharging was performed to 3.0 V, to measure the initial capacity $C_0$. Thereafter, a charging-discharging operation was repeatedly performed in the environment of 60° C. wherein charging was performed by the 0.1 C constant current method to 4.2 V, and discharging was performed to 3.0 V. Then the capacity $C_2$ after 100 cycles was measured. The high-temperature cycle property was evaluated based on the capacity change rate $\Delta C_C$ represented by $\Delta C_C = C_2/C_0 \times 100(\%)$. High value of the capacity change rate $\Delta C_C$ is indicative of high high-temperature cycle property.

5. Swelling Property of Electrode Plate

After the evaluation of "3. High-temperature storage property", the cell of the lithium ion secondary battery that had been subjected to the evaluation was disassembled, and the thickness d1 of the electrode plate of the negative electrode was measured. The thickness of the electrode plate of the negative electrode before the production of the cell of the lithium ion secondary battery was defined as d0, and the swelling ratio of the electrode plate of the negative electrode $((d1-d0)/d0) \times 100(\%)$ was calculated. Low value of this ratio is indicative of high swelling property of the electrode plate.

6. Adhesion Strength after Measurement of High-temperature Cycle Property

After the evaluation of "4. High-temperature cycle property", the cell of the lithium ion secondary battery that had been subjected to the evaluation was disassembled to remove the negative electrode. The electrode was dried for 24 hours at 60° C. under reduced pressure of 0.1 MPa or less. As to the dried negative electrode, adhesion strength was measured in the same manner as in "1. Adhesion strength", except that the size of the test piece was 40 mm in length and 10 mm in width.

7. Low-temperature Output Property

The laminate cell-type lithium ion secondary battery produced in Examples and Comparative Examples was left to stand still for 24 hours, and then charging operation at 0.1 C was performed in the environment of 25° C. for 5 hours, to measure the voltage $V_0$ at that time. Then discharging at 0.1 C was performed in the environment of −25° C., and the voltage $V_{10}$ was measured ten second after the onset of the discharging. The low-temperature output property was evaluated based on the voltage change $\Delta V$ represented by $\Delta V = V_0 - V_{10}$. Low value of the voltage change $\Delta V$ is indicative of high low-temperature output property.

8. Amount of Water in Electrode Plate

As to the negative electrode for lithium ion secondary battery produced in Examples and Comparative Examples, the Karl Fischer method (the used apparatus: Karl Fischer Moisture Titrator (manufactured by Kyoto Electronics Manufacturing Co., Ltd.)) was used for measuring the amount of water in the electrode plate (weight per unit weight of electrode active material layer, ppm).

9. Ion Conductivity

Each aqueous solution of the water-soluble polymer produced in Examples and Comparative Examples was poured into a silicon container so that the dried polymers had a thickness of 1 mm. The polymer was dried for 72 hours at room temperature to produce a 1 cm×1 cm square film. The film was immersed in a 1.0 mol/L $LiPF_6$ solution (solvent: mixture of ethylene carbonate/diethyl carbonate at a volume ratio of 1/2) for 72 hours at 60° C. The film thickness d after the immersion was measured, and the film was placed in between two copper foils. The resistance R was measured at alternating current impedance of 0.001 to 1000000 Hz, and the ion conductivity=R×1/d was calculated.

10. Method for Measuring the Swelling Degree

Each of aqueous dispersions of the particulate binders and the aqueous solutions of the water-soluble polymers, which were produced in Examples and Comparative Examples, was poured into a silicon container so that the dried material had a thickness of 1 mm. The material was dried for 72 hours at room temperature to produce a 1 cm×1 cm square film. Then the weight M0 thereof was measured. The film was immersed in a 1.0 mol/L LiPF$_6$ solution (solvent: mixture of ethylene carbonate/diethyl carbonate at a volume ratio of 1/2 and a solubility parameter of 10.8(cal/cm$^3$)$^{1/2}$) for 72 hours at 60° C. The weight of the film M1 after the immersion was measured, and the swelling degree was calculated from the equation (M1−M0)/M0.

Based on the swelling degree of the particulate binder V0 and the swelling degree of the water-soluble polymer V1, the ratio V1/V0 was calculated.

Example 1

(1-1. Production of Water-soluble Polymer)

In a 5 MPa pressure-resistant container equipped with a stirrer, 32.5 parts of methacrylic acid (acidic functional group-containing monomer), 0.8 part of ethylene dimethacrylate (crosslinkable monomer), 7.5 parts of 2,2,2-trifluoroethyl methacrylate (fluorine-containing (meth)acrylic acid ester monomer), 59.2 parts of butyl acrylate (another monomer), 1.5 parts of polyoxyalkylene alkenyl ether ammonium sulfate (reactive surfactant monomer, "LATEMUL PD-104" of Kao Corporation), 150 parts of ion-exchanged water, and 0.5 part of potassium persulfate (polymerization initiator) were placed and sufficiently stirred. Then the mixture was heated to 60° C. to initiate polymerization. When the polymerization conversion ratio reached 96%, the mixture was cooled to terminate the reaction, to thereby obtain a mixture containing the water-soluble polymer. To the mixture containing the water-soluble polymer, 10% ammonia water was added for adjusting the pH to 8, to thereby obtain an aqueous solution containing the desired water-soluble polymer.

As to the water-soluble polymer thus obtained, the ion conductivity and the swelling degree were measured. The results are shown in Table 2.

(1-2. Production of Binder Composition)

In a 5 MPa pressure-resistant container equipped with a stirrer, 33 parts of 1,3-butadiene, 1.5 parts of methacrylic acid, 65.5 parts of styrene, 4 parts of sodium dodecylbenzenesulfonate as an emulsifier, 150 parts of ion-exchanged water, and 0.5 parts of potassium persulfate as a polymerization initiator were placed and sufficiently stirred. Then the mixture was heated to 50° C. to initiate polymerization. When the polymerization conversion ratio reached 96%, the mixture was cooled to terminate the reaction, to thereby obtain a mixture containing the particulate binder (SBR). To the mixture containing the particulate binder, a 5% aqueous sodium hydroxide solution was added for adjusting the pH to 8, and then unreacted monomers were removed by distillation under heating and reduced pressure. The mixture was cooled to 30° C. or lower, to obtain an aqueous dispersion containing the desired particulate binder.

As to the particulate binder thus obtained, the swelling degree was measured. Then the ratio of the swelling degree of the particulate binder relative to the swelling degree of the water-soluble polymer was calculated. The results are shown in Table 2.

The aqueous solution containing the water-soluble polymer obtained in (1-1) above was diluted with ion-exchanged water to adjust the concentration to 5%. This aqueous solution was mixed with the aqueous dispersion containing the particulate binder obtained in the above so that the ratio of the particulate binder: the water-soluble polymer=98:2 in terms of solid amounts, to obtain a binder composition.

(1-3. Production of Slurry Composition for Negative Electrode)

In a planetary mixer equipped with a disper, 90 parts of artificial graphite having a specific surface area of 4 m$^2$/g (volume average particle diameter: 24.5 μm) as a negative electrode active material; 10 parts of SiOC (volume average particle diameter: 12 μm); and 1 part in terms of solid content of 1% aqueous solution of carboxymethyl cellulose ("BSH-12" manufactured by Dai-Ichi Kogyo Seiyaku Co., Ltd.) as a dispersing agent were placed. The solid concentration was adjusted to 55% with ion-exchanged water, and the mixture was mixed at 25° C. for 60 minutes. Then, the solid concentration was adjusted to 52% with ion-exchanged water, and the mixture was further mixed at 25° C. for 15 minutes to obtain a solution mixture.

To the aforementioned solution mixture, 1.0 part by weight in terms of solid content of the aqueous dispersion containing the binder composition obtained in (1-2) above and ion-exchanged water were added so that the final solid concentration was adjusted to 50%, and mixing was further performed for additional ten minutes. The resultant mixture was subjected to defoaming treatment under reduced pressure, to thereby obtain a slurry composition for a negative electrode having a high flowability.

As to the slurry composition for a negative electrode thus obtained, application capability of was measured. The results are shown in Table 2.

(1-4. Production of Negative Electrode)

The slurry composition for a negative electrode thus obtained in (1-3) above was applied using a comma coater onto a 20 μm-thick copper foil which served as a current collector so that the film thickness after drying was approximately 150 μm, and the slurry composition was dried. The drying was performed by conveying the copper foil through an oven at 60° C. at a speed of 0.5 m/min. for two minutes. Subsequently, heat treatment was performed at 120° C. for two minutes, to obtain a raw material for a negative electrode. This raw material for a negative electrode was rolled by a roll press, to obtain a negative electrode having a negative electrode active material layer with a thickness of 80 μm.

As to the negative electrode thus obtained, adhesion strength and amount of water in the electrode plate were measured. The results are shown in Table 2.

(1-5. Production of Positive Electrode)

As a binder for a positive electrode, an aqueous dispersion containing 40% of an acrylate polymer having a glass transition temperature Tg of −40° C. and number average particle diameter of 0.20 μm was prepared. The acrylate polymer is a copolymer that was obtained by emulsion polymerization of a monomer mixture containing 78% by weight of 2-ethylhexyl acrylate, 20% by weight of acrylonitrile, and 2% by weight of methacrylic acid.

100 parts of LiFePO$_4$ of an olivine crystal structure having a volume average particle diameter of 0.5 μm as a positive electrode active material; 1 part in terms of solid content of 1% aqueous solution of carboxymethyl cellulose ("BSH-12" manufactured by Dai-Ichi Kogyo Seiyaku Co., Ltd.) as a dispersing agent; 5 parts in terms of solid content of the aforementioned 40% aqueous dispersion of the acrylate polymer as a binder, and ion-exchanged water were mixed. The amount of the ion-exchanged water was determined so that the total solid concentration was 40%. The aforementioned materials were mixed using a planetary mixer to prepare a slurry composition for a positive electrode.

The slurry composition for a positive electrode was applied using a comma coated onto a 20 μm-thick aluminum foil which served as a current collector so that the film thickness after drying was approximately 200 μm, and the slurry composition was dried. The drying was performed by conveying the aluminum foil through an oven at 60° C. at a speed of 0.5 m/min. for two minutes. Subsequently, heat treatment was performed at 120° C. for two minutes, to obtain a positive electrode.

(1-6. Preparation of Separator)

A single-layer polypropylene separator (width: 65 mm, length: 500 mm, thickness: 25 μm, produced by a dry method, porosity: 55%) was cut into a square piece of 5 cm×5 cm.

(1-7. Lithium Ion Secondary Battery)

As the exterior package of the battery, an aluminum exterior package was prepared. The positive electrode obtained in (1-5) above was cut into a square piece of 4 cm×4 cm and placed such that the surface of the current collector side is brought into contact with the aluminum exterior package. On the surface of the positive electrode active material layer of the positive electrode, the square separator obtained in (1-6) above was placed. An electrolyte liquid (solvent: EC/DEC=1/2 (volume ratio), electrolyte: 1 M concentration of $LiPF_6$) was injected so that air did not remain therein. The negative electrode obtained in (1-4) above was cut into a square piece of 4.2 cm×4.2 cm and placed on the separator so that the surface on the side of the negative electrode active material layer faced the separator. Heat sealing was performed at 150° C. to seal the aluminum exterior package so as to seal the openings of the aluminum wrapping material, whereby a lithium ion secondary battery was produced.

As to the lithium ion secondary battery thus obtained, evaluation on high-temperature storage property, high-temperature cycle property, electrode plate swelling property, adhesion strength after high-temperature cycle property measurement, and low-temperature output property was performed. The results are shown in Table 2.

Examples 2 to 15

Lithium ion secondary batteries and respective components of the lithium ion secondary batteries were produced and evaluated in the same manner as in Example 1 except that the types and amounts of the monomers used in the production of the water-soluble polymer in (1-1) were changed as shown in Tables 1, 3, and 5. The results are shown in Tables 2, 4, and 6.

Example 16

(16-1. Production of Water-soluble Polymer)

An aqueous solution containing a water-soluble polymer was obtained in the same manner as in Example 1 except that sodium dodecyl benzene sulfonate was added in place of adding polyoxyalkylene alkenyl ether ammonium sulfate in the production of the water-soluble polymer in (1-1) of Example 1.

In addition to the water-soluble polymer, this aqueous solution contained the added sodium dodecyl benzene sulfonate.

As to the water-soluble polymer thus obtained, ion conductivity and swelling degree were measured. The results are shown in Table 6.

(16-2. Production and Evaluation of Secondary Battery, etc.)

A lithium ion secondary battery and respective components of the lithium ion secondary battery were produced and evaluated in the same manner as in (1-2) to (1-7) of Example 1 except that the aqueous solution obtained in (16-1) above was used in place of that obtained in (1-1) of Example 1 as the aqueous solution containing the water-soluble polymer. The results are shown in Table 6.

Examples 17 to 18

Lithium ion secondary batteries and respective components of the lithium ion secondary batteries were produced and evaluated in the same manner as in Example 1 except that the added amounts of the 5% aqueous solution of the water-soluble polymer and the binder-containing aqueous dispersion in the production of the slurry composition for a negative electrode in (1-3) were changed and the ratio of the binder relative to the water-soluble polymer was changed as shown in Table 6. The results are shown in Table 6.

Example 19

A lithium ion secondary battery and respective components of the lithium ion secondary battery were produced and evaluated in the same manner as in Example 1 except that SiOC was not added and the added amount of artificial graphite was changed to 100 parts in the production of the slurry composition for a negative electrode in (1-3). The results are shown in Table 6.

Example 20

A lithium ion secondary battery and respective components of the lithium ion secondary battery were produced and evaluated in the same manner as in Example 1 except that Sn (volume average particle diameter: 14 μm) was used in place of SiOC in the production of the slurry composition for a negative electrode in (1-3). The results are shown in Table 6.

Example 21

(21-1. Production of Negative Electrode)

Spray drying granulation of the negative electrode slurry composition obtained in (1-3) of Example 1 was performed using a spray drier (OC-16: manufactured by Ohkawara Kakohki Co., Ltd.) under the conditions wherein the number of rotations of an atomizer of a rotating disk type (diameter 65 mm) was 25,000 rpm; the hot air temperature was 150° C.; and the temperature of a particle recovering outlet was 90° C., to obtain spherical composite particles with a volume average particle diameter of 56 μm and a sphericity of 93%.

To the rolls of a roll press machine (press-cut rough surface thermal roll manufactured by Hirano Gikenkogyo Co., Ltd., roll temperature of 100° C. and a press linear pressure of 3.9 kN/cm), the aforementioned composite particles were supplied together with a copper foil having a thickness of 20 μm, to form a sheet-shaped raw material for an electrode at a forming speed of 20 m/min. This raw material for an electrode was rolled by the roll press, to obtain a negative electrode for a secondary battery that had a layer structure of: (copper foil)/(negative electrode active material layer), wherein the negative electrode active material layer had a thickness of 80 μm.

(21-2. Production and Evaluation of Secondary Battery, etc.)

A lithium ion secondary battery and respective components of the lithium ion secondary battery were produced and evaluated in the same manner as in (1-5) to (1-7) of Example 1 except that the negative electrode obtained in (21-1) above was used in place of that obtained in (1-4) of Example 1 as the electrode. The results are shown in Table 6.

Example 22

A lithium ion secondary battery and respective components of the lithium ion secondary battery were produced and evaluated in the same manner as in Example 1 except that $SiO_x$ (volume average particle diameter: 5 μm) was used in place of SiOC in the production of the slurry composition for a negative electrode in (1-3) (therefore, the composition of the negative electrode active material was 90 parts of artificial graphite and 10 parts of $SiO_x$). The results are shown in Table 8.

Example 23

A lithium ion secondary battery and respective components of the lithium ion secondary battery were produced and evaluated in the same manner as in Example 1 except that a combination of 30.0 parts of methacrylic acid and 2.5 parts of 2-acrylamide-2-methylpropanesulfonic acid was used in place of 32.5 parts of methacrylic acid in the production of the water-soluble polymer in (1-1). The results are shown in Table 8.

Comparative Examples 1 to 5

(C1-1. Production of Water-soluble Polymer)

An aqueous solution containing a water-soluble polymer was obtained in the same manner as in the production of the water-soluble polymer in (1-1) of Example 1 except that the types and amounts of the monomers were changed as shown in Table 7.

In addition to the water-soluble polymer, the aqueous solution contained the added sodium dodecyl benzene sulfonate.

As to the water-soluble polymer thus obtained, ion conductivity and swelling degree were measured. The results are shown in Table 8.

(C1-2. Production and Evaluation of Secondary Battery, etc.)

Lithium ion secondary batteries and respective components of the lithium ion secondary battery were produced and evaluated in the same manner as in (1-2) to (1-7) of Example 1 except that the aqueous solution obtained in (C1-1) above was used in place of that obtained in (1-1) of Example 1 as the aqueous solution containing the water-soluble polymer. The results are shown in Table 8.

Comparative Example 6

A lithium ion secondary battery and respective components of the lithium ion secondary battery were produced and evaluated in the same manner as in Example 21 except that the negative electrode slurry composition obtained in Comparative Example 2 was used in place of that obtained in (1-3) of Example 1 as the negative electrode slurry composition. The results are shown in Table 8.

TABLE 1

| | Ex. 1 | Ex. 2 | Ex. 3 | Ex. 4 | Ex. 5 | Ex. 6 | Ex. 7 |
|---|---|---|---|---|---|---|---|
| Acidic functional type | MAA | MAA | MAA | MAA | MAA | MAA | MAA |
| Acidic functional amount | 32.5 | 32.5 | 32.5 | 32.5 | 32.5 | 32.5 | 32.5 |
| Cross linkable type | EDMA | EDMA | EDMA | EDMA | GMA | AGE | EDMA |
| Cross linkable amount | 0.8 | 0.4 | 1.2 | 1.8 | 0.8 | 0.8 | 0.8 |
| Fluorine type | TFEMA | TFEMA | TFEMA | TFEMA | TFEMA | TFEMA | None |
| Fluorine amount | 7.5 | 7.5 | 7.5 | 7.5 | 7.5 | 7.5 | 0 |
| Other monomer type | BA | BA | BA | BA | BA | BA | BA |
| Other monomer amount | 59.2 | 59.6 | 58.8 | 58.2 | 59.2 | 59.2 | 66.7 |
| Reactive surfactant type | POAAE | POAAE | POAAE | POAAE | POAAE | POAAE | POAAE |
| Reactive surfactant amount | 1.5 | 1.5 | 1.5 | 1.5 | 1.5 | 1.5 | 1.5 |
| Other surfactant type | — | — | — | — | — | — | — |
| Other surfactant amount | — | — | — | — | — | — | — |
| Negative electrode active material | SiOC/graphite = 10/90 | SiOC/graphite = 10/90 | SiOC/graphite = 10/90 | SiOC/graphite = 10/90 | SiOC/graphite = 10/90 | SiOC/graphite = 10/90 | SiOC/graphite = 10/90 |

TABLE 2

|  | Ex. 1 | Ex. 2 | Ex. 3 | Ex. 4 | Ex. 5 | Ex. 6 | Ex. 7 |
| --- | --- | --- | --- | --- | --- | --- | --- |
| Swelling degree | 1.1 | 1.22 | 1.05 | 1.02 | 1.25 | 1.56 | 1.22 |
| Ion conductivity | 7.5 × 10^−5 | 8.8 × 10^−5 | 5.8 × 10^−5 | 1.5 × 10^−5 | 5.7 × 10^−5 | 5.8 × 10^−5 | 1.6 × 10^−5 |
| Binder/water-soluble polymer | 98.0/2.0 | 98.0/2.0 | 98.0/2.0 | 98.0/2.0 | 98.0/2.0 | 98.0/2.0 | 98.0/2.0 |
| Negative electrode production | Coating | Coating | Coating | Coating | Coating | Coating | Coating |
| Peel strength | 16.7 | 14.9 | 16.8 | 19 | 15.4 | 14.8 | 16 |
| Pin hole | 2 | 2 | 3 | 4 | 5 | 7 | 1 |
| Electrode plate water amount | 254 | 250 | 255 | 248 | 255 | 260 | 365 |
| High-temperature storage property | 95.2 | 94.7 | 93.5 | 91.8 | 92.2 | 91.5 | 91.6 |
| High-temperature cycle property | 91.2 | 90.5 | 89 | 87.6 | 88.5 | 85 | 86.5 |
| Peel strength after high-temperature cycle property test | 12.6 | 11.6 | 13.5 | 14.9 | 11.4 | 10.9 | 9.9 |
| Electrode plate swelling property | 11.9 | 12.5 | 11.2 | 10.6 | 12.5 | 13 | 13.8 |
| Low temperature output property | 118 | 120 | 125 | 133 | 155 | 160 | 178 |

TABLE 3

|  | Ex. 8 | Ex. 9 | Ex. 10 | Ex. 11 | Ex. 12 | Ex. 13 | Ex. 14 |
| --- | --- | --- | --- | --- | --- | --- | --- |
| Acidic functional type | MAA | MAA | MAA | MAA | MAA | MAA | MAA |
| Acidic functional amount | 32.5 | 32.5 | 32.5 | 32.5 | 32.5 | 32.5 | 32.5 |
| Cross linkable type | EDMA | EDMA | EDMA | EDMA | EDMA | EDMA | EDMA |
| Cross linkable amount | 0.8 | 0.8 | 0.8 | 0.8 | 0.8 | 0.8 | 0.8 |
| Fluorine type | TFEMA | TFEMA | TFEMA | TFEMA | TFMMA | PFOA | TFEMA |
| Fluorine amount | 2.4 | 5 | 12 | 17 | 7.5 | 7.5 | 7.4 |
| Other monomer type | BA | BA | BA | BA | BA | BA | BA |
| Other monomer amount | 64.2 | 61.7 | 54.7 | 49.7 | 59.2 | 59.2 | 59.2 |
| Reactive surfactant type | POAAE | POAAE | POAAE | POAAE | POAAE | POAAE | POAAE |
| Reactive surfactant amount | 1.5 | 1.5 | 1.5 | 1.5 | 1.5 | 1.5 | 0.4 |
| Other surfactant type | — | — | — | — | — | — | — |
| Other surfactant amount | — | — | — | — | — | — | — |
| Negative electrode active material | SiOC/graphite = 10/90 | SiOC/graphite = 10/90 | SiOC/graphite = 10/90 | SiOC/graphite = 10/90 | SiOC/graphite = 10/90 | SiOC/graphite = 10/90 | SiOC/graphite = 10/90 |

TABLE 4

| | Ex. 8 | Ex. 9 | Ex. 10 | Ex. 11 | Ex. 12 | Ex. 13 | Ex. 14 |
|---|---|---|---|---|---|---|---|
| Swelling degree | 1.2 | 1.15 | 1.06 | 1.01 | 1.05 | 1 | 1.05 |
| Ion conductivity | $2.3 \times 10^{-5}$ | $5.5 \times 10^{-5}$ | $9.4 \times 10^{-5}$ | $2.0 \times 10^{-4}$ | $8.3 \times 10^{-5}$ | $2.0 \times 10^{-4}$ | $2.8 \times 10^{-5}$ |
| Binder/water-soluble polymer | 98.0/2.0 | 98.0/2.0 | 98.0/2.0 | 98.0/2.0 | 98.0/2.0 | 98.0/2.0 | 98.0/2.0 |
| Negative electrode production | Coating | Coating | Coating | Coating | Coating | Coating | Coating |
| Peel strength | 15.9 | 16.1 | 15.2 | 15 | 16.5 | 16 | 15.9 |
| Pin hole | 1 | 2 | 3 | 4 | 2 | 2 | 12 |
| Electrode plate water amount | 322 | 300 | 226 | 180 | 240 | 220 | 198 |
| High-temperature storage property | 93.1 | 93.5 | 95 | 95 | 92.5 | 92 | 91.8 |
| High-temperature cycle property | 90.3 | 91.2 | 91.6 | 91.8 | 88.9 | 88 | 87.1 |
| Peel strength after high-temperature cycle property test | 11 | 11 | 10.2 | 10 | 12 | 11.4 | 10.1 |
| Electrode plate swelling property | 12.8 | 12 | 11.5 | 11 | 12.5 | 12 | 12.6 |
| Low temperature output property | 160 | 135 | 110 | 106 | 126 | 120 | 165 |

TABLE 5

| | Ex. 15 | Ex. 16 | Ex. 17 | Ex. 18 | Ex. 19 | Ex. 20 | Ex. 21 |
|---|---|---|---|---|---|---|---|
| Acidic functional type | MAA | MAA | MAA | MAA | MAA | MAA | MAA |
| Acidic functional amount | 32.5 | 32.5 | 32.5 | 32.5 | 32.5 | 32.5 | 32.5 |
| Cross linkable type | EDMA | EDMA | EDMA | EDMA | EDMA | EDMA | EDMA |
| Cross linkable amount | 0.8 | 0.8 | 0.8 | 0.8 | 0.8 | 0.8 | 0.8 |
| Fluorine type | TFEMA | TFEMA | TFEMA | TFEMA | TFEMA | TFEMA | TFEMA |
| Fluorine amount | 7.5 | 7.5 | 7.5 | 7.5 | 7.5 | 7.5 | 7.5 |
| Other monomer type | BA | BA | BA | BA | BA | BA | BA |
| Other monomer amount | 59.2 | 59.2 | 59.2 | 59.2 | 59.2 | 59.2 | 59.2 |
| Reactive surfactant type | POAAE | — | POAAE | POAAE | POAAE | POAAE | POAAE |
| Reactive surfactant amount | 2.5 | — | 1.5 | 1.5 | 1.5 | 1.5 | 1.5 |
| Other surfactant type | — | SDBS | — | — | — | — | — |
| Other surfactant amount | — | 1.5 | — | — | — | — | — |
| Negative electrode active material | SiOC/graphite = 10/90 | SiOC/graphite = 10/90 | SiOC/graphite = 10/90 | SiOC/graphite = 10/90 | Graphite = 100 | Sn/graphite = 10/90 | SiOC/graphite = 10/90 |

TABLE 6

|  | Ex. 15 | Ex. 16 | Ex. 17 | Ex. 18 | Ex. 19 | Ex. 20 | Ex. 21 |
|---|---|---|---|---|---|---|---|
| Swelling degree | 1.55 | 1.68 | 1.1 | 1.1 | 1.1 | 1.1 | 1.1 |
| Ion conductivity | $1.0 \times 10^{-4}$ | $1.0 \times 10^{-4}$ | $7.5 \times 10^{-5}$ | $7.5 \times 10^{-5}$ | $7.5 \times 10^{-5}$ | $7.5 \times 10^{-5}$ | $7.5 \times 10^{-5}$ |
| Binder/water-soluble polymer | 98.0/2.0 | 98.0/2.0 | 99.5/0.5 | 96.0/4.0 | 98.0/2.0 | 98.0/2.0 | 98.0/2.0 |
| Negative electrode production | Coating | Coating | Coating | Coating | Coating | Coating | Powder forming |
| Peel strength | 15.7 | 14.2 | 14.6 | 22.5 | 14.2 | 17.6 | 17.5 |
| Pin hole | 1 | 10 | 3 | 1 | 1 | 2 | — |
| Electrode plate water amount | 283 | 366 | 266 | 178 | 310 | 235 | 185 |
| High-temperature storage property | 90.7 | 88.1 | 94 | 94.6 | 96.8 | 85.5 | 91.6 |
| High-temperature cycle property | 86.5 | 82.5 | 91.2 | 91.9 | 92.6 | 78.1 | 84.6 |
| Peel strength after high-temperature cycle property test | 9.7 | 10.9 | 8.9 | 17.6 | 10.9 | 10.4 | 13.6 |
| Electrode plate swelling property | 13.5 | 14.4 | 10.8 | 14.6 | 8.5 | 17.9 | 12.6 |
| Low temperature output property | 175 | 188 | 125 | 106 | 110 | 260 | 98 |

TABLE 7

|  | Ex. 22 | Ex. 23 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Acidic functional type | MAA | MAA/AMPS | MAA | MAA | MAA | MAA | MAA | MAA |
| Acidic functional amount | 32.5 | 30.0/2.5 | 20 | 80 | 20 | 20 | 80 | 80 |
| Cross linkable type | EDMA | EDMA | — | — | EDMA | — | — | — |
| Cross linkable amount | 0.8 | 0.8 | 0 | 0 | 10 | 0 | 0 | 0 |
| Fluorine type | TFEMA | TFEMA | — | — | — | — | — | — |
| Fluorine amount | 7.5 | 7.5 | 0 | 0 | 0 | 0 | 0 | 0 |
| Other monomer type | BA | BA | BA | BA | BA | Styrene | BA | BA |
| Other monomer amount | 59.2 | 59.2 | 80 | 20 | 70 | 80 | 20 | 20 |
| Reactive surfactant type | POAAE | POAAE | — | — | — | — | — | — |
| Reactive surfactant amount | 1.5 | 1.5 | — | — | — | — | — | — |
| Other surfactant type | — | — | SDBS | SDBS | SDBS | SDBS | SDBS | SDBS |
| Other surfactant amount | — | — | 1.5 | 1.5 | 1.5 | 1.5 | 1.5 | 1.5 |
| Negative electrode active material | SiOx/graphite = 10/90 | SiOC/graphite = 10/90 | SiOC/graphite = 10/90 | SiOC/graphite = 10/90 | SiOC/graphite = 10/90 | SiOC/graphite = 10/90 | Graphite = 100 | SiOC/graphite = 10/90 |

TABLE 8

| | Ex. 22 | Ex. 23 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Swelling degree | 1.1 | 1.2 | 3.5 | 7.5 | 0.7 | 1.5 | 7.5 | 7.5 |
| Ion conductivity | $7.5 \times 10^{-5}$ | $8.9 \times 10^{-5}$ | $6.5 \times 10^{-6}$ | $8.0 \times 10^{-4}$ | $3.5 \times 10^{-6}$ | $2.0 \times 10^{-6}$ | $8.0 \times 10^{-4}$ | $8.0 \times 10^{-4}$ |
| Binder/water-soluble polymer | 98.0/2.0 | 98.0/2.0 | 98.0/2.0 | 98.0/2.0 | 98.0/2.0 | 98.0/2.0 | 98.0/2.0 | 98.0/2.0 |
| Negative electrode production | Coating | Coating | Coating | Coating | Coating | Coating | Coating | Powder forming |
| Peel strength | 14.8 | 14.1 | 10.5 | 9.2 | 11 | 10.2 | 8.4 | 8.4 |
| Pin hole | 3 | 2 | 15 | 22 | 26 | 18 | 18 | 18 |
| Electrode plate water amount | 289 | 305 | 545 | 640 | 478 | 450 | 585 | 585 |
| High-temperature storage property | 94.3 | 92.8 | 78.1 | 80.2 | 86.4 | 79 | 88.3 | 88.3 |
| High-temperature cycle property | 90.7 | 89.7 | 75.6 | 78 | 80 | 74.3 | 84.6 | 84.6 |
| Peel strength after high-temperature cycle property test | 11.9 | 10.6 | 5.4 | 4.8 | 8.1 | 6.2 | 5.5 | 5.5 |
| Electrode plate swelling property | 12.8 | 13.2 | 19.8 | 18.5 | 16.5 | 15.5 | 14.1 | 14.1 |
| Low temperature output property | 115 | 100 | 215 | 235 | 220 | 254 | 188 | 188 |

Meaning of the abbreviations in the tables are as follows:
MAA: methacrylic acid
AMPS: 2-acrylamide-2-methylpropanesulfonic acid
EDMA: ethylene dimethacrylate
TFEMA: 2,2,2-trifluoroethyl methacrylate
BA: butyl acrylate
POAAE: polyoxyalkylene alkenyl ether ammonium sulfate
GMA: glycidyl methacrylate
AGE: allyl glycidyl ether
TFMMA: trifluoromethyl methacrylate
PFOA: perfluorooctyl acrylate
SDBS: sodium dodecylbenzenesulfonate Acidic functional group type: type of acidic functional group-containing monomer Acidic functional group amount: containing ratio (part) of acidic functional group-containing monomer Crosslinkable monomer type: type of crosslinkable monomer Crosslinkable monomer amount: containing ratio (part) of crosslinkable monomer Fluorine type: type of fluorine-containing (meth)acrylic acid ester monomer Fluorine amount: containing raio (part) of fluorine-containing (meth)acrylic acid ester monomer Other monomer type: type of other monomers (i.e., monomers other than acidic functional group-containing monomer, crosslinkable monomer, fluorine-containing (meth) acrylic acid ester monomer, and reactive surfactant monomer) used in production of water-soluble polymer Other monomer amount: containing ratio (part) of other monomers (i.e., monomers other than acidic functional group-containing monomer, crosslinkable monomer, fluorine-containing (meth)acrylic acid ester monomer, and reactive surfactant monomer) used in production of water-soluble polymer Reactive surfactant type: type of reactive surfactant monomer Reactive surfactant amount: containing ratio (part) of reactive surfactant monomer Other surfactant type: type of surfactant other than reactive surfactant added for producing water-soluble polymer Other surfactant amount: containing ratio of surfactant other than reactive surfactant added for producing water-soluble polymer Negative electrode active material: type and weight ratio of negative electrode active material Swelling degree: ratio V1/V0 of swelling degree of particulate binder relative to swelling degree of water-soluble polymer Ion conductivity: ion conductivity of water-soluble polymer (S/cm)

Binder/water-soluble polymer: weight ratio of (particulate binder/water-soluble polymer) in binder for negative electrode Peel strength: peel strength of negative electrode active material measured by adhesion property test (N/m)

Pinhole: the number of pinholes measured by application capability test

Electrode plate water amount: water amount of negative electrode active material layer (ppm)

High-temperature storage property: capacity change rate $\Delta C_S$(%) measured by high-temperature storage property test High-temperature cycle property: capacity change rate $\Delta C_c$(%) measured by high-temperature cycle property test Peel strength after high-temperature cycle property test: peel strength (N/m) measured by adhesion strength test after measurement for high-temperature cycle property Electrode plate swelling property: rate of negative electrode plate swelling $((d1-d0)/d0) \times 100$(%)

Low-temperature output property: voltage change $\Delta V$ (mV) measured by low-temperature output property Table 9 shows the respective ratios (%) of the acidic functional group-containing monomer, the crosslinkable monomer, the fluorine-containing (meth)acrylic acid ester monomer, the reactive surfactant monomers, and the other monomers in Examples and Comparative Examples, based on the total of these components being 100%.

TABLE 9

|  | Acid | Cross link | Fluorine | Other | Reactive | Total |
|---|---|---|---|---|---|---|
| Ex. 1 | 32.0 | 0.8 | 7.4 | 58.3 | 1.5 | 100.0 |
| Ex. 2 | 32.0 | 0.4 | 7.4 | 58.7 | 1.5 | 100.0 |
| Ex. 3 | 32.0 | 1.2 | 7.4 | 57.9 | 1.5 | 100.0 |
| Ex. 4 | 32.0 | 1.8 | 7.4 | 57.3 | 1.5 | 100.0 |
| Ex. 5 | 32.0 | 0.8 | 7.4 | 58.3 | 1.5 | 100.0 |
| Ex. 6 | 32.0 | 0.8 | 7.4 | 58.3 | 1.5 | 100.0 |
| Ex. 7 | 32.0 | 0.8 | 0.0 | 65.7 | 1.5 | 100.0 |
| Ex. 8 | 32.0 | 0.8 | 2.4 | 63.3 | 1.5 | 100.0 |
| Ex. 9 | 32.0 | 0.8 | 4.9 | 60.8 | 1.5 | 100.0 |
| Ex. 10 | 32.0 | 0.8 | 11.8 | 53.9 | 1.5 | 100.0 |
| Ex. 11 | 32.0 | 0.8 | 16.7 | 49.0 | 1.5 | 100.0 |
| Ex. 12 | 32.0 | 0.8 | 7.4 | 58.3 | 1.5 | 100.0 |
| Ex. 13 | 32.0 | 0.8 | 7.4 | 58.3 | 1.5 | 100.0 |
| Ex. 14 | 32.4 | 0.8 | 7.4 | 59.0 | 0.4 | 100.0 |
| Ex. 15 | 31.7 | 0.8 | 7.3 | 57.8 | 2.4 | 100.0 |
| Ex. 16 | 32.5 | 0.8 | 7.5 | 59.2 | 0.0 | 100.0 |
| Ex. 17 | 32.0 | 0.8 | 7.4 | 58.3 | 1.5 | 100.0 |
| Ex. 18 | 32.0 | 0.8 | 7.4 | 58.3 | 1.5 | 100.0 |
| Ex. 19 | 32.0 | 0.8 | 7.4 | 58.3 | 1.5 | 100.0 |
| Ex. 20 | 32.0 | 0.8 | 7.4 | 58.3 | 1.5 | 100.0 |
| Ex. 21 | 32.0 | 0.8 | 7.4 | 58.3 | 1.5 | 100.0 |
| Ex. 22 | 32.0 | 0.8 | 7.4 | 58.3 | 1.5 | 100.0 |
| Ex. 23 | 32.0 | 0.8 | 7.4 | 58.3 | 1.5 | 100.0 |
| Comp. Ex. 1 | 20.0 | 0.0 | 0.0 | 80.0 | 0.0 | 100.0 |
| Comp. Ex. 2 | 80.0 | 0.0 | 0.0 | 20.0 | 0.0 | 100.0 |
| Comp. Ex. 3 | 20.0 | 10.0 | 0.0 | 70.0 | 0.0 | 100.0 |
| Comp. Ex. 4 | 20.0 | 0.0 | 0.0 | 80.0 | 0.0 | 100.0 |
| Comp. Ex. 5 | 80.0 | 0.0 | 0.0 | 20.0 | 0.0 | 100.0 |
| Comp. Ex. 6 | 80.0 | 0.0 | 0.0 | 20.0 | 0.0 | 100.0 |

As shown in Tables 1 to 8, Examples that satisfy the requirements according to the present invention achieved good results in all the evaluation items in a well-balanced manner. On the contrary, Comparative Examples 1 to 6 that did not satisfy one or both of the ion conductivity and swelling degree requirements of the water-soluble polymer according to the present application were inferior in terms of peeling strength, had many pinholes, and had high electrode plate water amounts. As a result, they were inferior in the battery performance.

The invention claimed is:

1. A binder composition for a negative electrode of a secondary battery, comprising:
   a particulate binder,
   a water-soluble polymer containing an acidic functional group, and
   water, wherein:
   the particulate binder is a polymer containing a first ethylenically unsaturated carboxylic acid monomer unit;
   a content of the first ethylenically unsaturated carboxylic acid monomer unit in the particulate binder is 0.5% by weight or more and 10% by weight or less,
   the water-soluble polymer is a polymer containing an acidic functional group-containing monomer unit;
   the acidic functional group-containing monomer unit is a second ethylenically unsaturated carboxylic acid monomer unit,
   a content of the second ethylenically unsaturated carboxylic acid monomer unit in the water-soluble polymer is 25% by weight or more and 60% by weight or less;
   a containing ratio of the particulate binder relative to the water-soluble polymer is such that (the particulate binder) / (the water-soluble polymer) is 99/1 to 96/4 in terms of a weight ratio;
   the water-soluble polymer has an ion conductivity of $1 \times 10^{-5}$ to $1 \times 10^{-3}$ S/cm, the ion conductivity being a value obtained by producing a film of the water-soluble polymer having a thickness of 1 mm and a size of 1 cm×1 cm, immersing the film in a 1.0 mol/L LiPF$_6$ solution (solvent: mixture of ethylene carbonate/diethyl carbonate at a volume ratio of 1/2) for 72 hours at 60° C., measuring the film thickness d after the immersion, placing the film between two copper foils, measuring resistance R at alternating current impedance of 0.001 to 1,000,000 Hz, and calculating the value from an equation "ion conductivity=R×1/d"; and
   a swelling degree of the water-soluble polymer to a liquid with a solubility parameter of 8 to 13 $(cal/cm^3)^{1/2}$ is 1.0 to 2.0 times a swelling degree of the particulate binder measured under the same conditions, the swelling degree being a value obtained by producing a film of each of an aqueous dispersion of the particulate binder and the water-soluble polymer having a thickness of 1 mm and a size of 1 cm×1 cm, measuring the weight M0 thereof, immersing the film in a 1.0 mol/L LiPF$_6$ solution (solvent: mixture of ethylene carbonate/diethyl carbonate at a volume ratio of 1/2) for 72 hours at 60° C., measuring the weight of the film M1 after the immersion, and calculating the value from an equation "swelling degree=(M1−M0)/M0".

2. The binder composition for a negative electrode of a secondary battery according to claim 1, wherein the water-soluble polymer contains a crosslinkable monomer unit, and a containing ratio of the crosslinkable monomer unit in the water-soluble polymer is 0.1 to 2% by weight.

3. The binder composition for a negative electrode of a secondary battery according to claim 1, wherein the water-soluble polymer contains a fluorine-containing (meth) acrylic acid ester monomer unit, and a containing ratio of the fluorine-containing (meth)acrylic acid ester monomer unit in the water-soluble polymer is 1 to 20% by weight.

4. The binder composition for a negative electrode of a secondary battery according to claim 1, wherein the water-soluble polymer contains a reactive surfactant unit, and a containing ratio of the reactive surfactant unit in the water-soluble polymer is 0.1 to 15% by weight.

5. A slurry composition for a negative electrode of a secondary battery, comprising a negative electrode active material and the binder composition for a negative electrode of a secondary battery according to claim 1.

6. A method for producing a negative electrode for a secondary battery, comprising: applying the slurry composition for a negative electrode of a secondary battery according to claim 5 onto a current collector; and drying the slurry composition.

7. A lithium ion secondary battery, comprising: a positive electrode; a negative electrode; an electrolyte liquid; and a separator, wherein the negative electrode is the negative electrode for a secondary battery obtained by the method according to claim 6.

8. The slurry composition for a negative electrode of a secondary battery according to claim 5, wherein the negative electrode active material contains a metal that stores and releases lithium.

9. The slurry composition for a negative electrode of a secondary battery according to claim 5, wherein the negative electrode active material contains a Si-containing compound.

10. The binder composition for a negative electrode of a secondary battery according to claim 1, wherein the ratio of the acidic functional group-containing monomer unit in the water-soluble polymer is 25% by weight or more and 60% by weight or less.

* * * * *